(12) United States Patent
Kadowaki et al.

(10) Patent No.: US 11,296,318 B2
(45) Date of Patent: Apr. 5, 2022

(54) POSITIVE ELECTRODE ACTIVE MATERIAL FOR ALL-SOLID-STATE LITHIUM-ION BATTERY, ELECTRODE, AND ALL-SOLID-STATE LITHIUM-ION BATTERY

(71) Applicant: SUMITOMO CHEMICAL COMPANY, LIMITED, Tokyo (JP)

(72) Inventors: Takuya Kadowaki, Niihama (JP); Jun-ichi Kageura, Niihama (JP); Chikara Murakami, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 17/148,158

(22) Filed: Jan. 13, 2021

(65) Prior Publication Data

US 2021/0226209 A1 Jul. 22, 2021

(30) Foreign Application Priority Data

Jan. 17, 2020 (JP) .............................. JP2020-006337

(51) Int. Cl.
*H01M 4/525* (2010.01)
*H01M 4/131* (2010.01)
(Continued)

(52) U.S. Cl.
CPC .......... *H01M 4/525* (2013.01); *H01M 4/131* (2013.01); *H01M 4/505* (2013.01);
(Continued)

(58) Field of Classification Search
CPC ................................................ H01M 10/0562
See application file for complete search history.

(56) References Cited

U.S. PATENT DOCUMENTS

2013/0022878 A1* 1/2013 Yada ........................ H01B 1/06
429/320
2015/0243982 A1 8/2015 Hiratsuka et al.
(Continued)

FOREIGN PATENT DOCUMENTS

EP 3678233 A1 7/2020
JP 2008147068 A * 6/2008
(Continued)

OTHER PUBLICATIONS

Machine translation of JP 2008-147068 A (Year: 2008).*
(Continued)

*Primary Examiner* — Robert S Carrico
(74) *Attorney, Agent, or Firm* — McDermott Will & Emery LLP

(57) ABSTRACT

The present invention provides a positive electrode active material for an all-solid-state lithium-ion battery, an electrode, and an all-solid-state lithium-ion battery capable of smoothly exchanging lithium ions with a solid electrolyte at a positive electrode and improving battery performance.
A positive electrode active material for an all-solid-state lithium-ion battery formed of particles includes crystals of a lithium metal composite oxide, in which the lithium metal composite oxide has a layered structure and contains at least Li and a transition metal, and the particles have an average crush strength of more than 50 MPa and satisfy Expression (1).

$$1.0\ \mu m \leq D_{min} \quad (1)$$

17 Claims, 1 Drawing Sheet

(51) Int. Cl.
  *H01M 4/505*   (2010.01)
  *H01M 10/0525*  (2010.01)
  *H01M 10/0562*  (2010.01)
  *H01M 10/44*   (2006.01)
  *H01M 4/02*   (2006.01)

(52) U.S. Cl.
  CPC ... *H01M 10/0525* (2013.01); *H01M 10/0562* (2013.01); *H01M 10/44* (2013.01); *H01M 2004/021* (2013.01); *H01M 2004/028* (2013.01); *H01M 2300/0071* (2013.01)

(56) References Cited

U.S. PATENT DOCUMENTS

| | | | |
|---|---|---|---|
| 2016/0118656 A1 | 4/2016 | Nakayama et al. | |
| 2016/0248090 A1 | 8/2016 | Maeda et al. | |
| 2020/0194788 A1* | 6/2020 | Imanari | H01M 4/525 |
| 2021/0028453 A1* | 1/2021 | Imanari | C01G 53/50 |

FOREIGN PATENT DOCUMENTS

| | | | | |
|---|---|---|---|---|
| JP | 2016-024916 A | 2/2016 | | |
| JP | 2016-157677 A | 9/2016 | | |
| JP | 2018-014317 A | 1/2018 | | |
| JP | 6265211 B2 | 1/2018 | | |
| JP | 2019-075355 A | 5/2019 | | |
| JP | 6542421 B1 | 7/2019 | | |
| JP | 2019-172530 A | 10/2019 | | |
| JP | 2019-172573 A | 10/2019 | | |
| WO | WO-2018043671 A * | 3/2018 | ............. | C01G 53/50 |
| WO | WO-2018110256 A1 * | 6/2018 | ............ | H01M 4/505 |
| WO | 2019/044733 A1 | 3/2019 | | |
| WO | 2019/044734 A1 | 3/2019 | | |

OTHER PUBLICATIONS

Kazunori Takada et al. "Introduction to All Solid Battery", Table of Contents, pp. 8-9, pp. 41, Imprint, First Edition published on Feb. 28, 2019, Nikkan Kogyo Shimbun, with partial English translation.

Japanese Opposition issued in corresponding Japanese Patent Application No. 2020-006337, dated Mar. 26, 2021, with partial English translation.

Korean Office Action issued in corresponding Korean Patent Application No. 10-2021-0004846, dated Feb. 22, 2021, with English translation.

Korean Office Action issued in corresponding Korean Patent Application No. 10-2021-0004846, dated Jul. 13, 2021, with English translation.

Extended European Search Report issued in corresponding European Patent Application No. 21151351.0-1108, dated Jun. 16, 2021.

* cited by examiner

POSITIVE ELECTRODE ACTIVE MATERIAL FOR ALL-SOLID-STATE LITHIUM-ION BATTERY, ELECTRODE, AND ALL-SOLID-STATE LITHIUM-ION BATTERY

BACKGROUND OF THE INVENTION

Field of the Invention

The present invention relates to a positive electrode active material for an all-solid-state lithium-ion battery, an electrode, and an all-solid-state lithium-ion battery.

Description of Related Art

Research on lithium-ion secondary batteries is being actively conducted for applications such as driving power sources for electric vehicles and household storage batteries. Among the above, all-solid-state lithium-ion secondary batteries have advantages such as higher energy density, a wider operating temperature range, and being less easily deteriorated in comparison with lithium-ion secondary batteries using an electrolytic solution in the related art. Therefore, all-solid-state lithium-ion secondary batteries are drawing attention as a next-generation energy storage device.

In the following description, "a lithium-ion secondary battery using an electrolytic solution of the related art" may be referred to as "a liquid-type lithium-ion secondary battery" so as to be distinguished from an all-solid-state lithium-ion secondary battery.

JP-A-2018-014317 describes an all-solid-state lithium-ion secondary battery using $LiNi_{1/3}Mn_{1/3}Co_{1/3}O_2$ as a positive electrode active material. $LiNi_{1/3}Mn_{1/3}Co_{1/3}O_2$ is a material well-known as a positive electrode active material of a liquid-type lithium-ion secondary battery.
[Patent Document 1] JP-A-2018-014317

SUMMARY OF THE INVENTION

At the positive electrode of an all-solid-state lithium-ion secondary battery, lithium ions are exchanged between the positive electrode active material and the solid electrolyte. In research into all-solid-state lithium-ion secondary batteries, there has been a demand for a positive electrode active material capable of smoothly exchanging the lithium ions described above and improving battery performance such as cycle characteristics.

In addition, when researching all-solid-state lithium-ion secondary batteries, the research findings of liquid-type lithium-ion secondary batteries of the related art may not be useful. Therefore, research specific to all-solid-state lithium-ion secondary batteries became necessary.

The present invention was made in view of such circumstances and has an object of providing a positive electrode active material for an all-solid-state lithium-ion battery capable of smoothly exchanging the lithium ions with a solid electrolyte at a positive electrode and improving cycle characteristics.

In addition, another object is to provide an electrode and an all-solid-state lithium-ion battery, which have such a positive electrode active material for an all-solid-state lithium-ion battery.

In the present specification, "good cycle characteristics" means that the amount of decrease in the battery capacity due to repeated charging and discharging is small, and that the capacity ratio at the time of remeasurement does not easily decrease with respect to the initial capacity.

In order to solve the above problems, the present invention includes the following aspects.

[1] A positive electrode active material for an all-solid-state lithium-ion battery including particles including crystals of a lithium metal composite oxide, in which the lithium metal composite oxide has a layered structure and contains at least Li and a transition metal, and the particles have an average crush strength of more than 50 MPa and satisfy Expression (1)

$$1.0 \ \mu m \leq D_{min} \quad (1)$$

(in Expression (1), $D_{min}$ is a minimum particle size (μm) in a cumulative particle size distribution curve obtained by measuring with a laser diffraction type particle size distribution measuring device).

[2] The positive electrode active material for an all-solid-state lithium-ion battery according to [1], in which the positive electrode active material is used for an all-solid-state lithium-ion battery including an oxide-based solid electrolyte.

[3] The positive electrode active material for an all-solid-state lithium-ion battery according to [1] or [2], in which the transition metal is at least one type selected from the group consisting of Ni, Co, Mn, Ti, Fe, V, and W.

[4] The positive electrode active material for an all-solid-state lithium-ion battery according to [3], in which the lithium metal composite oxide is represented by Formula (A)

$$Li[Li_x(Ni_{(1-y-z-w)}Co_yMn_zM_w)_{1-x}]O_2 \quad (A)$$

(here, M is one or more types of elements selected from the group consisting of Fe, Cu, Ti, Mg, Al, W, B, Mo, Nb, Zn, Sn, Zr, Ga, and V, and $-0.10 \leq x \leq 0.30$, $0 \leq y \leq 0.40$, $0 \leq z \leq 0.40$, and $0 \leq w \leq 0.10$ are satisfied).

[5] The positive electrode active material for an all-solid-state lithium-ion battery according to [4], in which, in Formula (A), $1-y-z-w \geq 0.50$ and $y \leq 0.30$ are satisfied.

[6] The positive electrode active material for an all-solid-state lithium-ion battery according to any one of [1] to [5], in which the particles are formed of a primary particle, a secondary particle which is an aggregate of the primary particle, and a single particle which exists independently of the primary particle and the secondary particle, and a content proportion of the single particle in the particles is 20% or more.

[7] An electrode including the positive electrode active material for an all-solid-state lithium-ion battery according to any one of [1] to [6].

[8] The electrode according to [7], further including a solid electrolyte.

[9] An all-solid-state lithium-ion battery including a positive electrode, a negative electrode, and a solid electrolyte layer interposed between the positive electrode and the negative electrode, in which the solid electrolyte layer includes a first solid electrolyte, the positive electrode has a positive electrode active material layer contacting the solid electrolyte layer and a current collector in which the positive electrode active material layer is laminated, and the positive electrode active material layer includes the positive electrode active material for an all-solid-state lithium-ion battery according to any one of [1] to [6].

[10] The all-solid-state lithium-ion battery according to [9], in which the positive electrode active material layer includes the positive electrode active material for an all-solid-state lithium-ion battery and a second solid electrolyte.

[11] The all-solid-state lithium-ion battery according to [10], in which the first solid electrolyte and the second solid electrolyte are the same material.

[12] The all-solid-state lithium-ion battery according to any one of [9] to [11], in which the first solid electrolyte has a non-crystalline structure.

[13] The all-solid-state lithium-ion battery according to any one of [9] to [12], in which the first solid electrolyte is an oxide-based solid electrolyte.

According to the present invention, it is possible to provide a positive electrode active material for an all-solid-state lithium-ion battery capable of smoothly exchanging the lithium ions with a solid electrolyte at a positive electrode and improving battery performance. In addition, it is also possible to provide an electrode and an all-solid-state lithium-ion battery, which have such a positive electrode active material for an all-solid-state lithium-ion battery.

DETAILED DESCRIPTION OF THE INVENTION

Figure 1:
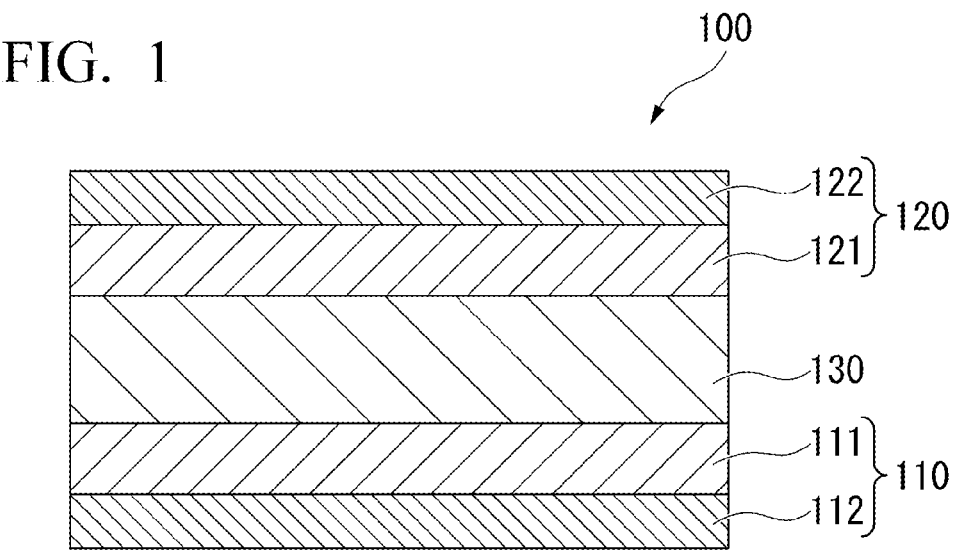
FIG. 1 is a schematic diagram showing a laminated body included in an all-solid-state lithium-ion battery of the embodiment.

<Positive Electrode Active Material for all-Solid-State Lithium-Ion Battery>

In a case where the surface of a particulate lithium metal composite oxide have a coated layer formed of a metal composite oxide described below, the particles having the coated layer correspond to the "particles including crystals of a lithium metal composite oxide" according to one embodiment of the present invention.

In addition, in a case where the surface of the particulate lithium metal composite oxide do not have a coated layer formed of a metal composite oxide, the lithium metal composite oxide correspond to the "particles including crystals of a lithium metal composite oxide" according to one embodiment of the present invention.

The positive electrode active material for an all-solid-state lithium-ion battery of the present embodiment is particles including crystals of a lithium metal composite oxide. The positive electrode active material for an all-solid-state lithium-ion battery of the present embodiment is a positive electrode active material suitable for use in an all-solid-state lithium-ion battery including an oxide-based solid electrolyte.

The positive electrode active material for an all-solid-state lithium-ion battery of the present embodiment may be simply referred to below as "positive electrode active material".

The positive electrode active material of the present embodiment satisfies the following requirements.

(Requirement 1) The lithium metal composite oxide included in the positive electrode active material has a layered structure and includes at least Li and a transition metal.

(Requirement 2) The average crush strength of the lithium metal composite oxide included in the positive electrode active material exceeds 50 MPa.

(Requirement 3) The particle size distribution of the particles included in the positive electrode active material satisfies Expression (1).

$$1.0 \, \mu m \leq D_{min} \quad (1)$$

(In Expression (1), $D_{min}$ is the minimum particle size (μm) in a cumulative particle size distribution curve obtained by measuring with a laser diffraction type particle size distribution measuring device).

A description will be given below in order.

(Requirement 1: Lithium Metal Composite Oxide)

The lithium metal composite oxide includes, as a transition metal, at least one type element selected from the group consisting of Ni, Co, Mn, Ti, Fe, V, and W.

Due to the lithium metal composite oxide including at least one type element selected from the group consisting of Ni, Co, and Mn as a transition metal, the obtained lithium metal composite oxide forms a stable crystal structure to which Li ions are desorbable or insertable. Therefore, it is possible to obtain a high charge or discharge capacity in a case where the positive electrode active material of the present embodiment is used for a positive electrode of a secondary battery.

In addition, the obtained lithium metal composite oxide has a strong crystal structure due to the lithium metal composite oxide including at least one type element selected from the group consisting of Ti, Fe, V, and W. Therefore, the positive electrode active material of the present embodiment is a positive electrode active material having high thermal stability. In addition, the positive electrode active material of the present embodiment has improved cycle characteristics.

More specifically, the lithium metal composite oxide is represented by composition formula (A).

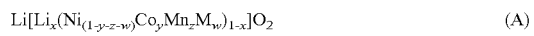

$$Li[Li_x(Ni_{(1-y-z-w)}Co_yMn_zM_w)_{1-x}]O_2 \quad (A)$$

(here, M is at least one type of element selected from the group consisting of Fe, Cu, Ti, Mg, Al, W, B, Mo, Nb, Zn, Sn, Zr, Ga, La, and V, and $-0.1 \leq x \leq 0.30$, $0 \leq y \leq 0.40$, $0 \leq z \leq 0.40$, $0 \leq w \leq 0.10$, and $0 < y+z+w$ are satisfied).

(x)

From the viewpoint of obtaining a lithium secondary battery having good cycle characteristics, x in the composition formula (A) is preferably more than 0, more preferably 0.01 or more, and even more preferably 0.02 or more. In addition, from the viewpoint of obtaining a lithium secondary battery having a higher initial Coulomb efficiency, x in the composition formula (A) is preferably 0.25 or less, and more preferably 0.10 or less.

In the present specification, "good cycle characteristics" means characteristics in which the amount of decrease in battery capacity due to repeated charging and discharging is small and means that the capacity ratio does not easily decrease with respect to the initial capacity at the time of remeasurement.

In addition, in the present specification, the "initial Coulomb efficiency" is a value determined by "(initial discharge capacity)/(initial charge capacity)×100(%)". A secondary battery having high initial Coulomb efficiency has a small irreversible capacity at the time of initial charge or discharge and it is easy for the capacity per volume and weight to be relatively large.

It is possible to arbitrarily combine the upper limit value and the lower limit value of x. In the composition formula (A), x may be −0.10 or more and 0.25 or less, or may be −0.10 or more and 0.10 or less.

x may be greater than 0 and 0.30 or less, greater than 0 and 0.25 or less, or greater than 0 and 0.10 or less.

x may be 0.01 or more and 0.30 or less, 0.01 or more and 0.25 or less, or 0.01 or more and 0.10 or less.

x may be 0.02 or more and 0.3 or less, 0.02 or more and 0.25 or less, or 0.02 or more and 0.10 or less.

In the present embodiment, x preferably satisfies $0<x\leq0.30$.

(y)

From the viewpoint of obtaining a lithium secondary battery having a low internal battery resistance, y in the composition formula (A) is preferably more than 0, more preferably 0.005 or more, even more preferably 0.01 or more, and particularly preferably 0.05 or more. In addition, from the viewpoint of obtaining a lithium secondary battery having high thermal stability, y in the composition formula (A) is more preferably 0.35 or less, even more preferably 0.33 or less, and yet more preferably 0.30 or less.

It is possible to arbitrarily combine the upper limit value and lower limit value of y. In the composition formula (A), y may be 0 or more and 0.35 or less, may be 0 or more and 0.33 or less, or may be 0 or more and 0.30 or less.

y may be greater than 0 and 0.40 or less, may be greater than 0 and 0.35 or less, may be greater than 0 and 0.33 or less, and may be greater than 0 and 0.30 or less.

y may be 0.005 or more and 0.40 or less, may be 0.005 or more and 0.35 or less, may be 0.005 or more and 0.33 or less, and may be 0.005 or more and 0.30 or less.

y may be 0.01 or more and 0.40 or less, may be 0.01 or more and 0.35 or less, may be 0.01 or more and 0.33 or less, and may be 0.01 or more and 0.30 or less.

y may be 0.05 or more and 0.40 or less, may be 0.05 or more and 0.35 or less, may be 0.05 or more and 0.33 or less, and may be 0.05 or more and 0.30 or less.

In the present embodiment, y preferably satisfies $0<y\leq0.40$.

In the present embodiment, in the composition formula (A), $0<x\leq0.10$, and $0<y\leq0.40$ is more preferable.

(z)

From the viewpoint of obtaining a lithium secondary battery with high cycle characteristics, z in the composition formula (A) is preferably more than 0, more preferably 0.01 or more, further preferably 0.02 or more, and even more particularly preferably 0.1 or more. In addition, from the viewpoint of obtaining a lithium secondary battery having high storage stability at high temperatures (for example, in an environment of 60° C.), z in the composition formula (A) is preferably 0.39 or less, more preferably 0.38 or less, and even more preferably 0.35 or less.

It is possible to arbitrarily combine the upper limit value and lower limit value of z. In the composition formula (A), z may be 0 or more and 0.39 or less, may be 0 or more and 0.38 or less, or may be 0 or more and 0.35 or less.

z may be 0.01 or more and 0.40 or less, may be 0.01 or more and 0.39 or less, may be 0.01 or more and 0.38 or less, and may be 0.01 or more and 0.35 or less.

z may be 0.02 or more and 0.40 or less, may be 0.02 or more and 0.39 or less, may be 0.02 or more and 0.38 or less, and may be 0.02 or more and 0.35 or less.

z may be 0.10 or more and 0.40 or less, may be 0.10 or more and 0.39 or less, may be 0.10 or more and 0.38 or less, or may be 0.10 or more and 0.35 or less.

In the present embodiment, z preferably satisfies $0.02\leq z\leq0.35$.

(w)

From the viewpoint of obtaining a lithium secondary battery having a low internal resistance of the battery, w in the composition formula (A) is preferably more than 0, more preferably 0.0005 or more, and even more preferably 0.001 or more. In addition, from the viewpoint of obtaining a lithium secondary battery having a large discharge capacity at a high current rate, w in the composition formula (A) is preferably 0.09 or less, more preferably 0.08 or less, and even more preferably 0.07 or less.

It is possible to arbitrarily combine the upper limit value and lower limit value of w. In the composition formula (A), w may be 0 or more and 0.09 or less, may be 0 or more and 0.08 or less, or may be 0 or more and 0.07 or less.

w may be greater than 0 and 0.10 or less, may be greater than 0 and 0.09 or less, may be greater than 0 and 0.08 or less, and may be greater than 0 and 0.07 or less.

w may be 0.0005 or more and 0.10 or less, may be 0.0005 or more and 0.09 or less, may be 0.0005 or more and 0.08 or less, or may be 0.0005 or more and 0.07 or less.

w may be 0.001 or more and 0.10 or less, may be 0.001 or more and 0.09 or less, may be 0.001 or more and 0.08 or less, or may be 0.001 or more and 0.07 or less.

In the present embodiment, w preferably satisfies $0\leq w\leq0.07$.

(y+z+w)

From the viewpoint of obtaining a lithium secondary battery having a large battery capacity, in the present embodiment, y+z+w in the composition formula (A) is preferably 0.50 or less, more preferably 0.48 or less, and even more preferably 0.46 or less.

y+z+w in the composition formula (A) exceeds 0 and is preferably 0.001 or more, and more preferably 0.002 or more.

y+z+w is preferably more than 0 and 0.50 or less.

The lithium metal composite oxide satisfies $1-y-z-w\geq0.50$ and $y\leq0.30$ in the composition formula (A). That is, in the lithium metal composite oxide, in the composition formula (A), preferably, the Ni content molar ratio is 0.50 or more and the Co content molar ratio is 0.30 or less.

(M)

M in the composition formula (A) represents one or more types of elements selected from the group consisting of Fe, Cu, Ti, Mg, Al, W, B, Mo, Nb, Zn, Sn, Zr, Ga, La, and V.

In addition, from the viewpoint of obtaining a lithium secondary battery with high cycle characteristics, M in the composition formula (A) is preferably one or more types of elements selected from the group consisting of Ti, Mg, Al, W, B, and Zr, and more preferably one or more types of elements selected from the group consisting of Al and Zr. In addition, from the viewpoint of obtaining a lithium secondary battery having high thermal stability, one or more types of elements selected from the group consisting of Ti, Al, W, B, and Zr is preferable.

As an example of a preferable combination of x, y, z, and w described above, x is 0.02 or more and 0.30 or less, y is 0.05 or more and 0.30 or less, z is 0.02 or more and 0.35 or less, and w is 0 or more and 0.07 or less. Examples include a lithium metal composite oxide where x=0.05, y=0.20, z=0.30, and w=0, a lithium metal composite oxide where x=0.05, y=0.08, z=0.04, and w=0, and a lithium metal composite oxide where x=0.25, y=0.07, z=0.02, and w=0.

<Composition Analysis>

It is possible to confirm the composition of the lithium metal composite oxide of the present embodiment by dissolving particles of the positive electrode active material including lithium metal composite oxide in hydrochloric acid and then analyzing the composition using an inductively coupled plasma emission spectrometer (for example, SPS3000 manufactured by SII NanoTechnology Inc.). The above analysis results for Li and the transition metal can be regarded as the result of the composition analysis of the lithium metal composite oxide.

Here, the charging of the all-solid-state lithium-ion battery is performed by applying a negative potential to the positive electrode and a positive potential to the negative electrode from an external power source.

In addition, the discharging of the all-solid-state lithium-ion battery is performed by connecting the discharge circuit to the positive electrode and negative electrode of the charged all-solid-state lithium-ion battery and energizing the discharge circuit. The discharge circuit includes an electronic device, an electric device, and an electric vehicle driven by the power of an all-solid-state lithium-ion battery.

(Layered Structure)

In the present embodiment, the crystal structure of the lithium metal composite oxide is a layered structure. The crystal structure of the lithium metal composite oxide is more preferably a hexagonal crystal structure or a monoclinic crystal structure.

The hexagonal crystal structure is assigned to any one space group selected from the group consisting of P3, P3$_1$, P3$_2$, R3, P-3, R-3, P312, P321, P3$_1$12, P3$_1$21, P3$_2$12, P3$_2$21, R32, P3 m1, P31m, P3c1, P31c, R3m, R3c, P-31m, P-31c, P-3 m1, P-3c1, R-3m, R-3c, P6, P6$_1$, P6$_5$, P6$_2$, P6$_4$, P6$_3$, P-6, P6/m, P6$_3$/m, P622, P6$_1$22, P6$_5$22, P6$_2$22, P6$_4$22, P6$_3$22, P6 mm, P6cc, P63 cm, P63mc, P-6m2, P-6c2, P-62m, P-62c, P6/mmm, P6/mcc, P6$_3$/mcm, and P6$_3$/mmc.

In addition, the monoclinic crystal structure is assigned to any one space group selected from the group consisting of P2, P2$_1$, C2, Pm, Pc, Cm, Cc, P2/m, P2$_1$/m, C2/m, P2/c, P2$_1$/c, and C2/c.

Among the above, in order to obtain a lithium secondary battery having a high discharge capacity, the crystal structure is particularly preferably a hexagonal crystal structure assigned to the space group R-3m or a monoclinic crystal structure assigned to C2/m.

<Method for Confirming Layered Structure>

The crystal structure can be confirmed by observing a positive electrode active material using a powder X-ray diffraction measurement device.

An X-ray diffractometer is used for powder X-ray diffraction measurement.

As the X-ray diffractometer, for example, Ultima IV manufactured by Rigaku Co., Ltd. can be used.

(Requirement 2: Average Crush Strength)

In the present embodiment, the "average crush strength" of the lithium metal composite oxide particles included in the positive electrode active material refers to a value measured by the following method.

<Measurement of Average Crush Strength>

First, a test pressure is applied to one lithium metal composite oxide particle selected from the positive electrode active material powder according to the criteria described below, and the displacement amount of the lithium metal composite oxide particle is measured.

For the measurement, a "Micro compression tester MCT-510" manufactured by Shimadzu Corporation is used.

When the test pressure is gradually increased, the pressure value at which the displacement amount is maximized while the test pressure remains almost constant is set as a test force (P).

From the obtained test force (P), a crush strength (St) is calculated by formula (A) (refer to Journal of the Mining and Metallurgical Institute of Japan, Vol. 81, (1965)). This operation is performed seven times in total, and the average crush strength is calculated from the average value of five instances of the crush strength excluding the maximum and minimum values. In formula (A), d is the particle size of the lithium metal composite oxide.

$$St = 2.8 \times P/(\pi \times d \times d) \qquad (A)$$

[Particle Selection Criteria]

Particles of lithium metal composite oxide having a size of approximately D50 (unit: μm) 2 μm measured by a method described below are selected. When making the selection, extremely distorted particles are avoided. Specifically, particles having a ratio of minor axis to major axis (minor axis/major axis) of 0.7 or more and 1.3 or less are selected. Here, "major axis" means the longest diameter of the particles. "Minor axis" means the shortest diameter of the particles.

In the present embodiment, the average crush strength of the lithium metal composite oxide particles included in the positive electrode active material is preferably 50 MPa or more, more preferably 60 MPa or more, and particularly preferably 70 MPa or more.

The average crush strength is not particularly limited. Examples of the average crush strength include 150 MPa or less, 120 MPa or less, and 100 MPa or less.

It is possible to arbitrarily combine the upper limit value and lower limit value.

Examples of combinations include 50 MPa or more and 150 MPa or less, 60 MPa or more and 120 MPa or less, and 70 MPa or more and 100 MPa or less.

(Requirement 3: Particle Size Distribution)

Regarding requirement 3 described above, it is possible to measure the "volume-based cumulative particle size distribution" by a measurement method with the laser diffraction scattering method as the measurement principle. Particle size distribution measurement with the laser diffraction scattering method as the measurement principle is called "laser diffraction type particle size distribution measurement".

<Measurement of Particle Size Distribution>

Specifically, the cumulative particle size distribution of the positive electrode active material is measured by the following measuring method.

First, 0.1 g of the positive electrode active material is placed into 50 ml of a 0.2 mass % sodium hexametaphosphate aqueous solution to obtain a dispersion liquid in which the positive electrode active material is dispersed.

Next, the particle size distribution of the obtained dispersion liquid is measured using the Microtrac MT3300EXII (laser diffraction scattering particle size distribution measuring device) manufactured by MicrotracBEL Corp., and a volume-based cumulative particle size distribution curve is obtained. The measurement range of the particle size distribution was 0.02 μm or more and 2000 μm or less.

The minimum value of the particle size in the obtained particle size distribution curve is $D_{min}$ (μm).

In addition, in the obtained cumulative particle size distribution curve, the value of the particle size at the point where the cumulative volume from the fine particle side is 50%, when the whole is 100%, is set as the 50% cumulative volume particle size $D_{50}$ (μm).

[Expression (1)]

The particles in the positive electrode active material of the present embodiment satisfies Expression (1).

$$1.0 \ \mu m \leq D_{min} \qquad (1)$$

The lower limit of $D_{min}$ is preferably 1.05 μm or more, more preferably 1.1 μm or more, and particularly preferably 2.0 μm or more.

The upper limit of $D_{min}$ is preferably less than 10.0 µm, more preferably 9.0 µm or less, particularly preferably 8.0 µm or less, and especially preferably 7.0 µm or less.

It is possible to arbitrarily combine the upper limit and lower limit.

As example combinations, 1.0 µm or more and 10.0 µm or less is preferable, 1.05 µm or more and 9.0 µm or less is more preferable, 1.1 µm or more and 8.0 µm or less is even more preferable, and 2.0 µm or more and 7.0 µm or less is particularly preferable.

In order to set the particle size distribution in a desired range, the positive electrode active material of the present embodiment may be a mixture of two or more types of lithium metal composite oxides having different particle sizes.

According to research by the inventors, it was understood that, in a case of being used in the positive electrode of a liquid-type lithium-ion secondary battery of the related art, even with a positive electrode active material exhibiting good battery performance, the performance was sometimes insufficient in a case of being used in a positive electrode of an all-solid-state lithium-ion battery. As a result of the inventors' research based on findings unique to such all-solid-state lithium-ion secondary batteries, it was understood that, in the positive electrode active material of the present embodiment satisfying the above requirement 1 to requirement 3, high cycle characteristics are measured in a case of being used at the positive electrode of the all-solid-state lithium-ion battery.

First, in the positive electrode active material of the present embodiment, satisfying requirement 1 makes it possible to favorably perform lithium ion insertion and desorption.

In addition, the positive electrode active material of the present embodiment satisfies requirements 2 to 3. In the positive electrode of the all-solid-state lithium-ion secondary battery, the positive electrode active material exchanges the lithium ions between the positive electrode active material and the solid electrolyte.

In the positive electrode, there are voids between the positive electrode active materials. With respect to the size of the voids, the submicron-sized fine particles having a very small diameter do not easily have contact points with the positive electrode active material at the periphery. Here, submicron-sized fine particles having a very small diameter and present in the voids between the positive electrode active materials are referred to as "isolated particles".

In a case of a liquid-type lithium secondary battery, the electrolytic solution is able to penetrate into the voids, thus, even for isolated particles, can possibly serve as a conductive path for lithium ions.

On the other hand, in a case of an all-solid-state lithium-ion secondary battery, it is difficult for isolated particles to secure a conductive path. For this reason, isolated particles do not easily contribute to charging and discharging. That is, in a case of an all-solid-state lithium-ion secondary battery, the smaller the amount of isolated particles present, the more the battery characteristics improve.

In the positive electrode active material which satisfies requirement 2, the lithium metal composite oxide particles do not easily crack in a case where pressure is applied during manufacturing or use.

Here, in the manufacturing of an all-solid-state lithium-ion battery, pressure is applied to the positive electrode active material powder when the powder is mixed or when powder compact formation is performed or when all-solid-state lithium-ion battery including the positive electrode active material is assembled.

And, pressure applied to the positive electrode active material powder remains inside the battery as confining pressure.

Furthermore, when using an all-solid-state lithium-ion battery, pressure onto the positive electrode active material powder repeatedly increases and decreases accompanying the expansion and contraction when charging and discharging are repeated.

For example, in a case where an oxide-based solid electrolyte is used as the solid electrolyte, an applied pressure of 50 MPa or more is assumed, and in a case where a sulfide-based solid electrolyte is used, an applied pressure of 200 MPa or more is assumed.

The positive electrode active material which satisfies requirement 2 is less likely to generate isolated particles in a case of being used repeatedly. That is, since the conductive path for the lithium ions is not reduced even in cases of repeated use, the capacity does not easily decrease. For this reason, it is possible to improve the cycle characteristics of the all-solid-state lithium-ion secondary battery.

In addition, the positive electrode active material which satisfies requirement 3 has no isolated particles present or an extremely small amount thereof.

For the above reasons, the positive electrode active material of the present embodiment which satisfies the requirements 1 to 3 does not easily decrease in capacity in a case of being used as the positive electrode of the all-solid-state lithium-ion battery and is able to improve the cycle characteristics of the all-solid-state lithium-ion secondary battery.

In the present embodiment, it is possible to evaluate the battery performance of the all-solid-state lithium-ion battery according to the cycle retention rate determined by the following method.

<Manufacturing of all-Solid-State Lithium-Ion Secondary Battery>

(Manufacturing of Positive Electrode Active Material Sheet)

A positive electrode active material and $Li_3BO_3$ are mixed in a composition of positive electrode active material: $Li_3BO_3$=80:20 (molar ratio) to obtain a mixed powder. A resin binder (ethyl cellulose), a plasticizer (dioctyl phthalate), and a solvent (acetone) are added to the obtained mixed powder to form a composition in which mixed powder:resin binder:plasticizer:solvent=100:10:10:100 (mass ratio), and mixing is carried out using a planetary stirring and defoaming device.

The obtained slurry is defoamed using a planetary stirring and defoaming device to obtain a positive electrode mixture slurry.

Using a doctor blade, the obtained positive electrode mixture slurry is coated on a PET film and the coating film is dried to form a positive electrode film with a thickness of 50 µm.

The positive electrode film is separated from the PET film, punch-processed into a circle with a diameter of 14.5 mm, and further uniaxially pressed at 20 MPa in the thickness direction of the positive electrode film for 1 minute to obtain a positive electrode active material sheet with a thickness of 40 µm.

(Manufacturing of all-Solid-State Lithium-Ion Battery)

A positive electrode active material sheet and solid electrolyte pellets of $Li_{6.75}La_3Zr_{1.75}Nb_{0.25}O_{12}$ (for example, manufactured by Toshima Manufacturing Co., Ltd.) are laminated and uniaxially pressed in parallel with the laminating direction to obtain a laminated body.

A positive electrode current collector (gold foil, thickness: 500 µm) is further stacked on the obtained positive electrode active material sheet of the laminated body and heated at 300° C. for 1 hour in a state of being pressed at 100 gf to burn off organic components. Furthermore, the temperature is increased to 800° C. at 5° C./minute and then sintered at 800° C. for 1 hour to obtain a laminated body of the solid electrolyte layer and the positive electrode.

Next, the following operations are performed in a glove box in an argon atmosphere.

A negative electrode (Li foil, thickness 300 µm), a negative electrode current collector (stainless steel plate, thickness 50 µm), and a wave washer (made of stainless steel) are further stacked on the solid electrolyte layer in the laminated body of the solid electrolyte layer and the positive electrode.

For the laminated body stacked from the positive electrode to the wave washer, the positive electrode is placed on the lower lid of a coin-type battery R2032 part (manufactured by Hohsen Corp.), the upper lid is stacked on the wave washer, and crimping is carried out with a caulking machine to produce an all-solid-state lithium-ion battery.

<Cycle Test>

Using the all-solid-state lithium-ion battery manufactured by the method described above, a charge and discharge cycle test is carried out under the conditions shown below, and the cycle retention rate is calculated.

Cycle Test Conditions

Test temperature: 60° C.

Maximum charging voltage: 4.3V, charging current: 0.01CA, cutoff current: 0.002CA, constant current constant voltage charging Minimum discharging voltage: 2.5V, discharge current: 0.01CA, constant current discharge Number of cycles: 3

The discharge capacity of the first cycle is set as the initial capacity of the cycle, the value obtained by dividing the discharge capacity of the third cycle by the initial capacity of the cycle is calculated, and this value is set as the cycle retention rate.

(Other Configuration 1)

For the positive electrode active material of the present embodiment, the particles forming the positive electrode active material are preferably formed of primary particles, secondary particles is an aggregate of the primary particles, and single particles present independently of the primary particles and secondary particles.

<Method for Confirming Particle Shape>

In the present invention, "primary particles" means particles which have no grain boundary in terms of the external appearance when observed using a scanning electron microscope in a field of view of 20,000× and in which the particle size is less than 0.5 µm.

In the present invention, "secondary particles" means aggregations of the primary particles formed by aggregating primary particles. The secondary particles have grain boundaries in terms of the external appearance when observed using a scanning electron microscope in a field of view of 20,000×.

In the present invention, the "single particles" are particles which exist independently of the secondary particles, which have no grain boundary in terms of the external appearance when observed using a scanning electron microscope in a field of view of 20,000× and which have a particle size of 0.5 µm or more.

That is, the positive electrode active material of the present embodiment is formed of particles which have no grain boundaries in terms of the external appearance and particles which have grain boundaries in terms of the external appearance when observed using a scanning electron microscope in a field of view of 20,000×.

The particles which have no grain boundaries in terms of the external appearance are formed of "primary particles", which have a small particle size, and "single particles" with a large particle size, based on a particle size of 0.5 µm.

The particles which have grain boundaries in terms of the external appearance are "secondary particles" which are aggregations of the "primary particles" described above.

In the positive electrode active material of the present embodiment, the content proportion of single particles in the entire particles is preferably 20% or more in terms of quantity. In a case where a positive electrode active material in which the content proportion of the single particles in all of the particles is 20% or more is used in an all-solid-state battery, the contact interface with the solid electrolyte in the positive electrode layer is easily secured and the conduction of lithium ions through the interface is performed smoothly.

In addition, in the positive electrode active material in which the content proportion of the single particles in the whole particles is 20% or more, there is no grain boundary in the particles of the single particles in all of the particles, thus, even when charging and discharging is repeated using the positive electrode of the all-solid-state battery, the particles are not easily broken and the conductive path is easily maintained.

<Method for Measuring Content of Single Particle>

The content proportion of single particle is calculated by the way described below.

First, the positive electrode active material powder is observed using a scanning electron microscope in a field of view of 20,000×, and the numbers of each of single particles and counted in this field respectively. As the number of single particles is set as N1 and that of secondary particles is set as N2, the content proportion is calculated by N1/(N1+N2). In a case where the number of particles observed in a single field of view of 20,000× are less than 50, multiple consecutive images are obtained until the number of particles that are observed reaches 50, and the content proportion is calculated as described above.

The average particle size of the single particles is preferably 0.5 µm or more, and more preferably 1.0 µm or more. In addition, the average particle size of the single particles is preferably 10 µm or less, and more preferably 5 µm or less.

It is possible to arbitrarily combine the upper limit values and lower limit values of the average particle size of the single particles.

The average particle size of the secondary particles is preferably 3.0 µm or more, and more preferably 5.0 µm or more. In addition, the average particle size of the secondary particles is preferably 15 µm or less, and more preferably 10 µm or less.

It is possible to arbitrarily combine the upper limit values and lower limit values of the average particle size of the secondary particles.

It is possible to measure the average particle size of the single particles and the secondary particles by the following method.

First, the positive electrode active material of the present embodiment is placed on a conductive sheet attached on a sample stage. Then, the positive electrode active material is irradiated with an electron beam having an accelerating voltage of 20 kV and observed using a scanning electron microscope in a field of view of 20,000×. As the scanning electron microscope, for example, it is possible to use JSM-5510 manufactured by JEOL Ltd.

Next, from the obtained electron microscope image (SEM photograph), 50 or more and 98 or less single particles or secondary particles are extracted by the method described below.

(Single Particle Extraction Method)

In a case of measuring the average particle size of single particles, all the single particles included in one field of view in the 20,000× magnified field of view are subjected to measurement. In a case where there are less than 50 single particles included in one field of view, single particles in a plurality of fields of view are subjected to measurement until the number of measurements reaches 50 or more.

(Method for Extracting Secondary Particles)

In a case of measuring the average particle size of the secondary particles, all secondary particles included in one field of view in the 20,000× magnified field of view are subjected to measurement. In a case where there are less than 50 secondary particles included in one field of view, the secondary particles in a plurality of fields of view are subjected to measurement until the number of measurements reaches 50 or more.

Regarding the image of the extracted single particles or secondary particles, when interposed between parallel lines drawn from a certain direction, the distance (constant direction diameter) between the parallel lines is measured as the particle size of the single particles or secondary particles.

The arithmetic average value of the obtained particle sizes of the single particles or secondary particles is the average particle size of the single particles included in the positive electrode active material or the average particle size of the secondary particles included in the positive electrode active material.

(Other Configuration 2)

In the present embodiment, the positive electrode active material preferably has a coated layer formed of the metal composite oxide on the surface of the lithium metal composite oxide forming the positive electrode active material.

As the metal composite oxide forming the coated layer, an oxide having lithium ion conductivity is suitably used.

Even in a case where the metal composite oxide forming the coated layer does not have lithium ion conductivity, if the coated layer is extremely thin (for example, 0.1 nm or more and 1.0 nm or less), it is known that the battery performance is improved as compared with a positive electrode active material which does not have a coated layer. In such a case, it is assumed that the coated layer exhibits lithium ion conductivity. However, methods for manufacturing a positive electrode active material by controlling and attaching a uniform coated layer to the surface of lithium metal composite oxide particles to a thickness of 0.1 nm or more and 1.0 nm or less are limited to manufacturing methods with poor mass productivity. Examples of such manufacturing methods having poor mass productivity include an ALD (Atomic Laser Deposition) method.

On the other hand, if the metal composite oxide forming the coated layer has lithium ion conductivity, even if the coated layer has a thickness of about 5 nm to 20 nm, the coated layer suitably conducts lithium ions and it is possible to improve battery performance, which is preferable.

Here, it is possible to measure the thickness of the coated layer by measuring a positive electrode active material exhibiting the maximum diameter of the 50% cumulative volume particle size D50 (μm) 5% obtained by laser diffraction particle size distribution measurement. The arithmetic average value of the values measured for 10 particles is set as the thickness of the coated layer.

For the particles of the positive electrode active material to be measured, the average thickness of the coated layer is determined from analysis results using Scanning Transmission Electron Microscope (STEM)-Energy Dispersive X-ray Spectroscopy (EDX). It is possible to determine the thickness of the coated layer by creating a line profile of the elements unique to the coated layer and setting a range in which the unique elements described above are detected based on the obtained line profile as the range in which the coated layer is present.

Examples of such a metal composite oxide include metal composite oxides of Li and at least one type of element selected from the group consisting of Nb, Ge, Si, P, Al, W, Ta, Ti, S, Zr, Zn, V, and B.

When the positive electrode active material of the present embodiment has a coated layer, the formation of a high resistance layer at the interface between the positive electrode active material and the solid electrolyte is suppressed and it is possible to realize a higher output with the all-solid-state battery. Such an effect is easily obtained in a sulfide-based all-solid-state battery using a sulfide-based solid electrolyte as the solid electrolyte.

<Method for Manufacturing Positive Electrode Active Material 1>

In manufacturing the lithium metal composite oxide contained in the positive electrode active material of the present embodiment, a metal composite compound is first prepared including a metal element other than Li among the metal elements forming the target lithium metal composite oxide. Then, preferably, the metal composite compound is mixed with a lithium compound and the obtained mixture is calcined.

In addition, the metal composite compound and the lithium compound are preferably calcined along with an inert melting agent.

Specifically, the "metal composite compound" is a compound which includes Ni, which is an essential metal element, and one or more type of arbitrary metal element from Co, Mn, Fe, Cu, Ti, Mg, Al, W, B, Mo, Nb, Zn, Sn, Zr, Ga, La, and V.

The metal composite compound is preferably a metal composite hydroxide or a metal composite oxide.

A description will be given below of an example of the method for manufacturing a lithium metal composite oxide divided into a metal composite compound manufacturing step and a lithium metal composite oxide manufacturing step.

(Manufacturing Metal Composite Compound)

It is possible to manufacture the metal composite compound by a commonly known coprecipitation method. As the coprecipitation method, it is possible to use a commonly known batch coprecipitation method or a continuous coprecipitation method. A detailed description will be given below of the method for manufacturing a metal composite compound by taking a metal composite hydroxide containing Ni, Co, and Mn as metal elements as an example.

First, a nickel salt solution, a cobalt salt solution, a manganese salt solution, and a complexing agent are reacted by a coprecipitation method, particularly, a continuous coprecipitation method described in JP-A-2002-201028, to manufacture a metal composite hydroxide represented by $Ni_{(1-y-z)}Co_yMn_z(OH)_2$ (in the formula, y+z<1).

The nickel salt which is a solute of the nickel salt solution described above is not particularly limited; however, it is possible to use, for example, any one type or two or more types of nickel sulfate, nickel nitrate, nickel chloride, and nickel acetate.

As the cobalt salt which is a solute of the cobalt salt solution described above, for example, it is possible to use any one type or two or more types of cobalt sulfate, cobalt nitrate, cobalt chloride, and cobalt acetate.

As the manganese salt which is a solute of the manganese salt solution described above, for example, it is possible to use any one type or two or more types of manganese sulfate, manganese nitrate, manganese chloride, and manganese acetate.

The above metal salts are used in a ratio corresponding to the composition ratio of $Ni_{(1-y-z)}Co_yMn_z(OH)_2$ described above. That is, each metal salt is used in amounts where the molar ratio of Ni in the solute of the nickel salt solution, Co in the solute of the cobalt salt solution, and Mn in the solute of the manganese salt solution are: (1-y-z):y:z corresponding to the composition ratio of $Ni_{(1-y-z)}Co_yMn_z(OH)_2$.

In addition, the solvent of the nickel salt solution, the cobalt salt solution, and the manganese salt solution is water.

A complexing agent is a compound capable of forming a complex with nickel ions, cobalt ions, and manganese ions in an aqueous solution. Examples of complexing agents include ammonium ion donors (ammonium salts such as ammonium hydroxide, ammonium sulfate, ammonium chloride, ammonium carbonate, and ammonium fluoride), hydrazine, ethylenediaminetetraacetic acid, nitrilotriacetic acid, uracildiacetic acid, and glycine.

In the step of manufacturing the metal composite hydroxide, a complexing agent may or may not be used. In a case where a complexing agent is used, the amount of the complexing agent included in the mixed solution including the nickel salt solution, the arbitrary metal salt solution, and the complexing agent has, for example, a molar ratio of more than 0 and 2.0 or less with respect to the total number of moles of the metal salt. In the present embodiment, the amount of the complexing agent included in the mixed solution including the nickel salt solution, the cobalt salt solution, the manganese salt solution, and the complexing agent has, for example, a molar ratio of more than 0 and 2.0 or less with respect to the total number of moles of the metal salt.

In the coprecipitation method, in order to adjust the pH value of the mixed solution including the nickel salt solution, the arbitrary metal salt solution, and the complexing agent, alkali metal hydroxide is added to the mixed solution before the pH of the mixed solution changes from alkaline to neutral. The alkali metal hydroxide is, for example, sodium hydroxide or potassium hydroxide.

The pH value in this specification is defined as the value measured when the temperature of the mixed solution is 40° C. The pH of the mixed solution is measured when the temperature of the mixed solution sampled from the reaction tank reaches 40° C.

When the complexing agent is continuously supplied to the reaction tank in addition to the nickel salt solution, cobalt salt solution, and manganese salt solution described above, the Ni, Co, and Mn react and $Ni_{(1-y-z)}Co_yMn_z(OH)_2$ is produced.

During the reaction, the temperature of the reaction tank is controlled, for example, to be in a range of 20° C. or higher and 80° C. or lower, and preferably to be in a range of 30° C. or higher and 70° C. or lower.

In addition, during the reaction, the pH value in the reaction tank is controlled to be, for example, in a range of pH 9 or higher and pH 13 or lower, and preferably pH 11 or higher and pH 13 or lower.

The materials in the reaction tank are mixed by appropriate stirring.

As the reaction tank used in the continuous coprecipitation method, it is possible to use a reaction tank of a type in which the formed reaction precipitate overflows for separation.

Appropriately controlling the metal salt concentration of the metal salt solution supplied to the reaction tank, the stirring speed, the reaction temperature, the reaction pH, the calcining conditions described below, and the like makes it possible to control various physical properties such as the secondary particle size and the pore radius of the finally obtained lithium metal composite oxide.

In addition to the control of the above conditions, various gases, for example, inert gases such as nitrogen, argon, and carbon dioxide, oxidizing gases such as air and oxygen, or mixed gases thereof may be supplied into the reaction tank to control the oxidation state of the obtained reaction product.

As a compound (oxidizing agent) which oxidizes the obtained reaction product, it is possible to use peroxides such as hydrogen peroxide, peroxide salts such as permanganate, perchlorates, hypochlorites, nitric acid, halogens, ozone, or the like.

As compounds which reduce the obtained reaction products, it is possible to use organic acids such as oxalic acid and formic acid, sulfites, hydrazine, and the like.

Specifically, the reaction tank may have an inert atmosphere. When the inside of the reaction tank is an inert atmosphere, among the metals included in the mixed solution, metal elements which are more easily oxidized than Ni are suppressed from aggregating before Ni. Therefore, it is possible to obtain a uniform metal composite hydroxide.

In addition, the inside of the reaction tank may be an appropriate oxidizing atmosphere. The oxidizing atmosphere may be an oxygen-containing atmosphere in which an oxidizing gas is mixed with an inert gas, or an oxidizing agent may be present in an inert gas atmosphere. Due to the inside of the reaction tank being an appropriate oxidizing atmosphere, the transition metal included in the mixed solution is appropriately oxidized and it is easy to control the form of the metal composite oxide.

The oxygen and oxidizing agent in the oxidizing atmosphere must have sufficient oxygen atoms to oxidize the transition metal.

In a case where the oxidizing atmosphere is an oxygen-containing atmosphere, it is possible to control the atmosphere in the reaction tank by methods such as passing the oxidizing gas through the reaction tank or bubbling the oxidizing gas in the mixed solution.

After the above reaction, the obtained reaction precipitate is washed with water and then dried to obtain a metal composite compound. In the present embodiment, nickel-cobalt-manganese hydroxide is obtained as the metal composite compound. In addition, in a case where the reaction precipitate is washed with water only and foreign matter derived from the mixed solution remains, the reaction precipitate may be washed with weak acid water or an alkaline solution, as necessary. Examples of the alkaline solution include aqueous solutions including sodium hydroxide and potassium hydroxide.

In the present embodiment, pulverizing the metal composite compound obtained by drying by applying an appropriate external force and adjusting the dispersed state of the particles makes it possible to obtain a metal composite hydroxide in which $D_{min}$ is easily controlled within the range of the present embodiment.

"Appropriate external force" refers to an external force which disperses the aggregated state without destroying the crystallites of the metal composite compound. In the present embodiment, it is preferable to use a grinder as the pulverizing machine at the time of the above pulverizing, and a stone mill type grinder is particularly preferable. In a case where a stone mill type grinder is used, it is preferable to adjust the clearance between the upper mill and the lower mill according to the aggregated state of the metal composite hydroxide. The clearance between the upper mill and the lower mill is preferably in a range of, for example, 10 µm or more and 200 µm or less.

In the examples described above, the nickel-cobalt-manganese composite hydroxide is manufactured, but the nickel-cobalt-manganese composite oxide may be prepared.

For example, it is possible to prepare the nickel-cobalt-manganese composite oxide by calcining the nickel-cobalt-manganese composite hydroxide. The calcining time is preferably 1 hour or more and 30 hours or less as the total time from the start of the temperature increase to reaching the temperature to the end of holding the temperature. The temperature increase rate in the heating step for reaching the maximum holding temperature is preferably 180° C./hour or more, more preferably 200° C./hour or more, and particularly preferably 250° C./hour or more.

The maximum holding temperature in this specification is the maximum temperature of the holding temperature of the atmosphere in the calcining furnace in the calcining step, and means the calcining temperature in the calcining step. In a case where the main calcining step has a plurality of heating steps, the maximum holding temperature means the maximum temperature of each heating step.

In the calcining apparatus, the temperature increase rate in the present specification is calculated from the time from the time of the start of the temperature increase until the maximum holding temperature is reached and the temperature difference from the temperature at start of the temperature increase in the calcining furnace of the calcining apparatus until the maximum holding temperature.

(Manufacturing Lithium Metal Composite Oxide)

In this step, after drying the metal composite oxide or metal composite hydroxide described above, the metal composite oxide or metal composite hydroxide and the lithium compound are mixed. In addition, in the present embodiment, when mixing the metal composite oxide or metal composite hydroxide and the lithium compound, it is preferable to mix an inert melting agent therewith at the same time.

By calcining a mixture including a metal composite oxide, a lithium compound, and an inert melting agent, or a mixture including a metal composite hydroxide, a lithium compound, and an inert melting agent, a mixture of the metal composite compound and the lithium compound is calcined in the presence of an inert melting agent. Calcining the mixture of the metal composite compound and the lithium compound in the presence of the inert melting agent makes it possible to suppress the primary particles from sintering to each other to produce the secondary particles. In addition, it is possible to promote the growth of single particles.

As the lithium compound, it is possible to use any one of lithium carbonate, lithium nitrate, lithium acetate, lithium hydroxide, lithium oxide, lithium chloride, and lithium fluoride, or a mixture of two or more thereof. Of these, either one or both of lithium hydroxide and lithium carbonate is preferable.

In a case where lithium hydroxide includes lithium carbonate as an impurity, the content proportion of lithium carbonate in lithium hydroxide is preferably 5% by mass or less.

In the present embodiment, the drying conditions for the metal composite oxide or metal composite hydroxide described above are not particularly limited. The drying conditions may be any of the following 1) to 3), for example.

1) Conditions under which the metal composite oxide or metal composite hydroxide is not oxidized or reduced. Specifically, these are drying conditions in which an oxide is maintained as an oxide and drying conditions in which a hydroxide is maintained as a hydroxide.

2) Conditions under which the metal composite hydroxide is oxidized. Specifically, these are drying conditions in which a hydroxide is oxidized into an oxide.

3) Conditions under which the metal composite oxide is reduced. Specifically, these are drying conditions in which an oxide is reduced to a hydroxide.

For the condition that oxidation or reduction do not occur, an inert gas such as nitrogen, helium or argon may be used in the atmosphere during drying.

Oxygen or air may be used in the atmosphere during drying for the condition that a hydroxide is oxidized.

In addition, for the condition that the metal composite oxide is reduced, a reducing agent such as hydrazine or sodium sulfite may be used in an inert gas atmosphere during drying.

After the metal composite oxide or metal composite hydroxide is dried, classification may be appropriately performed.

The above lithium compound and metal composite compound are used in consideration of the composition ratio of the final product. For example, in a case where the nickel-cobalt-manganese composite compound is used, the lithium compound and the metal composite compound are used in a ratio corresponding to the composition ratio of $Li[Li_x(Ni_{(1-y-z)}Co_yMn_z)_{1-x}]O_2$. In addition, in the lithium metal composite oxide which is the final product, in a case where Li is in excess (content molar ratio is more than 1), mixing is performed such that the molar ratio of Li included in the lithium compound and the metal element included in the metal composite compound is greater than 1.

It is possible to obtain a lithium metal composite oxide by calcining a mixed powder of a metal composite oxide or a metal composite hydroxide and a lithium compound.

Specifically, by calcining a mixture of a nickel-cobalt-manganese composite compound and a lithium compound, a lithium-nickel-cobalt-manganese composite oxide is obtained.

For the calcining, dry air, an oxygen atmosphere, an inert atmosphere, or the like is used depending on the desired composition, and, as necessary, a plurality of heating steps are carried out.

In the present embodiment, the mixture may be calcined in the presence of an inert melting agent. Calcining in the presence of an inert melting agent makes it possible to promote the reaction of the mixture. The inert melting agent may remain in the lithium metal composite oxide after calcining, or may be removed by washing with water, alcohol, after calcining or the like. In the present embodiment, after calcining, the lithium metal composite oxide is preferably washed using water or alcohol.

Adjusting the holding temperature during calcining makes it possible to control the particle size of the single particles in the preferable range of the present embodiment.

In the calcining step, calcining may be carried out only once, or there may be a plurality of calcining stages.

In a case where there are a plurality of calcining stages, the step of calcining at the highest temperature is described as the main calcining. Before the main calcining, a pre-calcining may be performed in which calcining is performed at a temperature lower than the main calcining. Further, after the main calcining, a post-calcining may be performed in which calcining is performed at a temperature lower than the main calcining.

The calcining temperature (maximum holding temperature) of the main calcining is preferably 600° C. or higher, more preferably 700° C. or higher, and particularly preferably 800° C. or higher, from the viewpoint of promoting particle growth and increasing $D_{min}$. In addition, from the viewpoint of preventing the formation of cracks in the particles and maintaining the particle strength, 1200° C. or lower is preferable, 1100° C. or lower is more preferable, and 1000° C. or lower is particularly preferable.

It is possible to arbitrarily combine the upper limit value and the lower limit value of the maximum holding temperature of the main calcining.

Examples of combinations include 600° C. or higher and 1200° C. or lower, 700° C. or higher and 1100° C. or lower, and 800° C. or higher and 1000° C. or lower.

The calcining temperature for pre-calcining or post-calcining may be lower than the calcining temperature for main calcining, and examples thereof include a range of 350° C. or higher and 700° C. or lower.

Normally, the higher the holding temperature, the larger the particle size of the single particles and the smaller the BET specific surface area tend to be. The holding temperature in calcining may be appropriately adjusted depending on the type of transition metal element, the precipitant, and the type and amount of the inert melting agent to be used.

In the present embodiment, the holding temperature may be set in consideration of the melting point of the inert melting agent described below, and is preferably performed in a range of the melting point of the inert melting agent minus 200° C. or higher and the melting point of the inert melting agent plus 200° C. or lower.

In addition, the holding time at the holding temperature may be 0.1 hour or more and 20 hours or less, and is preferably 0.5 hour or more and 10 hours or less. The temperature increase rate up to the holding temperature is usually 50° C./hour or more and 400° C./hour or less, and the temperature lowering rate from the holding temperature to room temperature is usually 10° C./hour or more and 400° C./hour or less. In addition, as a calcining atmosphere, it is possible to use air, oxygen, nitrogen, argon, or a mixed gas thereof.

(Arbitrary Tapping Step)

In the present embodiment, it is preferable to carry out a tapping operation on a mixed powder of a metal composite oxide or a metal composite hydroxide and a lithium compound.

It is also preferable to carry out the tapping operation in the same manner for the mixture including the metal composite oxide or the metal composite hydroxide, the lithium compound, and the inert melting agent.

Specifically, the tapping operation has the following operations, for example.

First, a sheath made of ceramics such as alumina is filled with the mixed powder or the mixture such that the filling rate is 70% or more and 95% or less. More specifically, a 30 cm×30 cm×10 cm alumina sheath is filled with 4500 g or more and 6000 g or less of a mixed powder or mixture.

Next, a tapping operation is performed in which the sheath to which the mixed powder or mixture is added is placed on a workbench, and the sheath is lifted approximately 1 cm with two hands and dropped.

The number of tappings is preferably 3 or more and 10 or less.

The tapping operation is preferably carried out before calcining.

Due to the tapping operation, uneven filling of the mixed powder or the mixture into the sheath is suppressed, and it is possible to fill the sheath at a higher density. By calcining in such a state, uneven calcining in the sheath is reduced. Due to this, it is possible to reduce the amount of the lithium metal composite oxide having low particle strength generated in a case where calcining is insufficient. For this reason, it becomes easy to obtain a lithium metal composite oxide satisfying requirement (2).

In a case where there are a plurality of calcining steps, the calcined product may be subjected to a tapping operation and further calcined after the tapping operation.

Description will be given below of an example of the manufacturing step in a case where there are a plurality of calcining steps and a tapping operation is carried out.

(Example 1) A primary calcined product is obtained by primary calcining, and the primary calcined product is calcined for a second time. A secondary calcined product obtained by secondary calcining is subjected to a tapping operation and then calcined for a third time.

(Reference Example) The primary calcined product obtained by the primary calcining is subjected to a tapping operation, and then is calcined for a second time.

In the case of (Example 1) or (Reference Example) described above, it is preferable to carry out the tapping operation in advance before the primary calcining.

The lithium metal composite oxide obtained by calcining is appropriately classified after pulverization and set as a positive electrode active material applicable to a lithium secondary battery.

In the present embodiment, pulverizing the lithium metal composite oxide obtained by calcining by applying an appropriate external force and adjusting the dispersed state of the particles makes it possible to obtain a positive electrode active material satisfying (requirement 3).

"Appropriate external force" refers to an external force which disperses the aggregated state without destroying the crystallites of the lithium metal composite oxide. In the present embodiment, it is preferable to use a grinder as the pulverizing machine at the time of the above pulverizing, and a stone mill type grinder is particularly preferable. In a case where a stone mill type grinder is used, it is preferable to adjust the clearance between the upper mill and the lower mill according to the aggregated state of the lithium metal composite oxide. The clearance between the upper mill and the lower mill is preferably in a range of, for example, 10 μm or more and 200 μm or less.

The inert melting agent able to be used in the present embodiment is not particularly limited as long as it does not easily react with the mixture during calcining. In the present embodiment, examples thereof include one or more types selected from the group consisting of fluorides of at least one or more types of elements selected from the group consisting of Na, K, Rb, Cs, Ca, Mg, Sr, and Ba (referred to below as "A"), chlorides of A, carbonates of A, sulfates of A, nitrates of A, phosphates of A, hydroxides of A, molybdates of A, and tungstates of A.

Examples of the fluorides of A include NaF (melting point: 993° C.), KF (melting point: 858° C.), RbF (melting point: 795° C.), CsF (melting point: 682° C.), $CaF_2$ (melting point: 1402° C.), $MgF_2$ (melting point: 1263° C.), $SrF_2$ (melting point: 1473° C.), and $BaF_2$ (melting point: 1355° C.).

Examples of chlorides of A include NaCl (melting point: 801° C.), KCl (melting point: 770° C.), RbCl (melting point: 718° C.), CsCl (melting point: 645° C.), $CaCl_2$) (melting point: 782° C.), $MgCl_2$ (melting point: 714° C.), $SrCl_2$ (melting point: 857° C.), and $BaCl_2$ (melting point: 963° C.).

Examples of the carbonates of A include $Na_2CO_3$ (melting point: 854° C.), $K_2CO_3$ (melting point: 899° C.), $Rb_2CO_3$ (melting point: 837° C.), $Cs_2CO_3$ (melting point: 793° C.), $CaCO_3$ (melting point: 825° C.), $MgCO_3$ (melting point: 990° C.), $SrCO_3$ (melting point: 1497° C.), and $BaCO_3$ (melting point: 1380° C.).

Examples of the sulfates of A include $Na_2SO_4$ (melting point: 884° C.), $K_2SO_4$ (melting point: 1069° C.), $Rb_2SO_4$ (melting point: 1066° C.), $Cs_2SO_4$ (melting point: 1005° C.), $CaSO_4$ (melting point: 1460° C.), $MgSO_4$ (melting point: 1137° C.), $SrSO_4$ (melting point: 1605° C.), and $BaSO_4$ (melting point: 1580° C.).

Examples of the nitrates of A, the phosphates of A, the hydroxides of A, the molybdates of A, and the tungstates of A include the materials described in JP6734491B.

In the present embodiment, it is also possible to use two or more types of these inert melting agents. In a case where two or more types are used, the melting point of the entire inert melting agent may be lowered.

In addition, among these inert melting agents, as the inert melting agent for obtaining the lithium metal composite oxide having higher crystallinity, one or more types of salts selected from the group consisting of carbonates of A, sulfates of A, and chlorides of A is preferable.

In addition, A is preferably either or both of Na and K.

That is, among the inert melting agents described above, a particularly preferable inert melting agent is one or more types selected from the group consisting of NaCl, KCl, $Na_2CO_3$, $K_2CO_3$, $Na_2SO_4$, and $K_2SO_4$.

Using these inert melting agents makes it possible to control the average crush strength of the obtained lithium metal composite oxide within a preferable range of the present embodiment.

In a case where either one or both of $K_2SO_4$ and $Na_2SO_4$ are used as the inert melting agent in the present embodiment, it is possible to control the average crush strength of the obtained lithium metal composite oxide within a preferable range of the present embodiment.

In the present embodiment, the amount of the inert melting agent present during calcining may be appropriately selected. In order for the average crush strength of the obtained lithium metal composite oxide to be within the range of the present embodiment, the amount of the inert melting agent present during calcining is preferably 0.1 part by mass or more with respect to 100 parts by mass of the lithium compound, and more preferably 1 part by mass or more. In addition, in a case where it is necessary to promote particle growth, an inert melting agent other than the examples of inert melting agents described above may be used therewith. Examples of the inert melting agent used in this case include ammonium salts such as $NH_4Cl$ and $NH_4F$, or the like.

(Forming Coated layer)

In a case of forming a coated layer on the surface of particles of the positive electrode active material, first, the coating material raw material and the lithium metal composite oxide are mixed. Next, as necessary, it is possible to form a coated layer on the surface of the particles of the lithium metal composite oxide by carrying out a heat treatment.

As the coating material raw and the method of forming the coated layer, the coating material raw and the method described in JP6734491B can be applied.

The particles forming a coated layer on the surface of the primary particles or secondary particles of the lithium metal composite oxide are appropriately crushed and classified to become a positive electrode active material for an all-solid-state lithium-ion battery.

<Method for Manufacturing Positive Electrode Active Material 2>

In a case where the positive electrode active material of the present embodiment includes single particles and secondary particles, it is possible to manufacture the positive electrode active material by making the following changes from the method for manufacturing the positive electrode active material 1 described above.

(Step of Manufacturing Metal Composite Compound)

In the method for manufacturing a positive electrode active material 2, in the step of manufacturing a metal composite compound, finally, a metal composite compound which forms the single particles and a metal composite compound which forms the secondary particles are respectively manufactured. Below, the metal composite compound which finally forms the single particles may be described as a "single particle precursor". In addition, a metal composite compound which finally forms the secondary particles may be described as a "secondary particle precursor".

In the method for manufacturing the positive electrode active material 2, when producing a metal composite compound by the coprecipitation method described above, a first coprecipitation tank for manufacturing a single particle precursor and a second coprecipitation tank for forming a secondary particle precursor are used.

It is possible to manufacture a single particle precursor by appropriately controlling the concentration of the metal salt supplied to the first coprecipitation tank, the stirring speed, the reaction temperature, the reaction pH, the calcining conditions described below, and the like.

Specifically, the temperature of the reaction tank is, for example, preferably 30° C. or higher and 80° C. or lower, more preferably controlled to be in a range of 40° C. or higher and 70° C. or lower, and even more preferably to be in a range of 20° C. with respect to the second reaction tank described below.

In addition, the pH value in the reaction tank is preferably, for example, pH 10 or more and pH 13 or less, more preferably controlled to be in a range of pH 11 or more and pH 12.5 or less, even more preferably to be in a range of pH 2 with respect to the second reaction tank described below and it is particularly preferable that the pH reaction tank is higher than that in the second reaction tank.

In addition, it is possible to manufacture the secondary particle precursor by appropriately controlling the concentration of the metal salt supplied to the second coprecipitation tank, the stirring speed, the reaction temperature, the reaction pH, the calcining conditions described below, and the like.

Specifically, the temperature of the reaction tank is, for example, preferably 20° C. or higher and 80° C. or lower, more preferably controlled to be in a range of 30° C. or higher and 70° C. or lower, and even more preferably to be in a range of 20° C. with respect to the second reaction tank described below.

In addition, the pH value in the reaction tank is preferably, for example, pH 10 or more and pH 13 or less, more preferably controlled to be in a range of pH 11 or more and pH 12.5 or less, even more preferably to be in a range of pH 2 with respect to the second reaction tank described below, and it is particularly preferable that the pH of the reaction tank be lower than that in the second reaction tank.

The nickel-cobalt-manganese composite hydroxide is isolated by washing with water and then drying the reaction products thus obtained. The nickel-cobalt-manganese composite hydroxide to be isolated includes a single particle precursor and a secondary particle precursor.

In the example described above, the nickel-cobalt-manganese composite hydroxide is manufactured, but the nickel-cobalt-manganese composite oxide may be prepared. For example, it is possible to prepare the nickel-cobalt-manganese composite oxide by calcining the nickel-cobalt-manganese composite hydroxide. It is possible to adopt the conditions described above as the calcining conditions of the nickel-cobalt-manganese composite hydroxide.

(Manufacturing Lithium Metal Composite Oxide)

In manufacturing the lithium metal composite oxide, the single particle precursor and the metal composite oxide or the metal composite hydroxide as the secondary particle precursor obtained in the step described above are dried, and then mixed with a lithium compound. The single particle precursor and the secondary particle precursor may be appropriately classified after drying.

Mixing the single particle precursor and the secondary particle precursor in a predetermined mass ratio at the time of mixing makes it possible to roughly control the presence ratio of the obtained single particles and secondary particles.

After mixing, the single particle precursor and the secondary particle precursor are aggregated or separated, respectively, and it is also possible for the secondary particles produced by the aggregation of the single particle precursor and single particles produced by separating the secondary particle precursor to each be present. Adjusting the mixing ratio of the single particle precursor and the secondary particle precursor and the conditions of the steps after mixing makes it possible to control the presence ratio of the single particles and the secondary particles in the finally obtained positive electrode active material.

Adjusting the holding temperature during calcining makes it possible to control the average particle size of the single particles and the average particle size of the secondary particles of the obtained positive electrode active material within the preferable range of the present embodiment.

<Manufacturing Positive Electrode Active Material 3>

In addition, in a case where the positive electrode active material of the present embodiment includes single particles and secondary particles, it is possible to carry out the manufacturing by manufacturing each of the first lithium metal composite oxide formed of single particles and the second lithium metal composite oxide formed of secondary particles by the method for manufacturing a positive electrode active material 1 described above and mixing the first lithium metal composite oxide and the second lithium metal composite oxide.

In the method for manufacturing a positive electrode active material 3, in the manufacturing the lithium metal composite oxide, the holding temperature when calcining the first lithium metal composite oxide may be set to be higher than the holding temperature when calcining the second lithium metal composite oxide. Specifically, in a case of manufacturing the first lithium metal composite oxide, the temperature is preferably 30° C. or higher than the holding temperature of the second lithium metal composite oxide, more preferably 50° C. or higher, and even more preferably 80° C. or higher.

Mixing the obtained first lithium metal composite oxide and second lithium metal composite oxide in a predetermined ratio makes it possible to obtain a positive electrode active material including single particles and secondary particles.

<All-Solid-State Lithium-Ion Battery>

Next, while explaining the configuration of the all-solid-state lithium-ion battery, a description will be given of a positive electrode using the all-solid-state lithium-ion battery positive electrode active material according to one embodiment of the present invention as a positive electrode active material of the all-solid-state lithium-ion battery, and an all-solid-state lithium-ion battery having the positive electrode.

Figure 2:
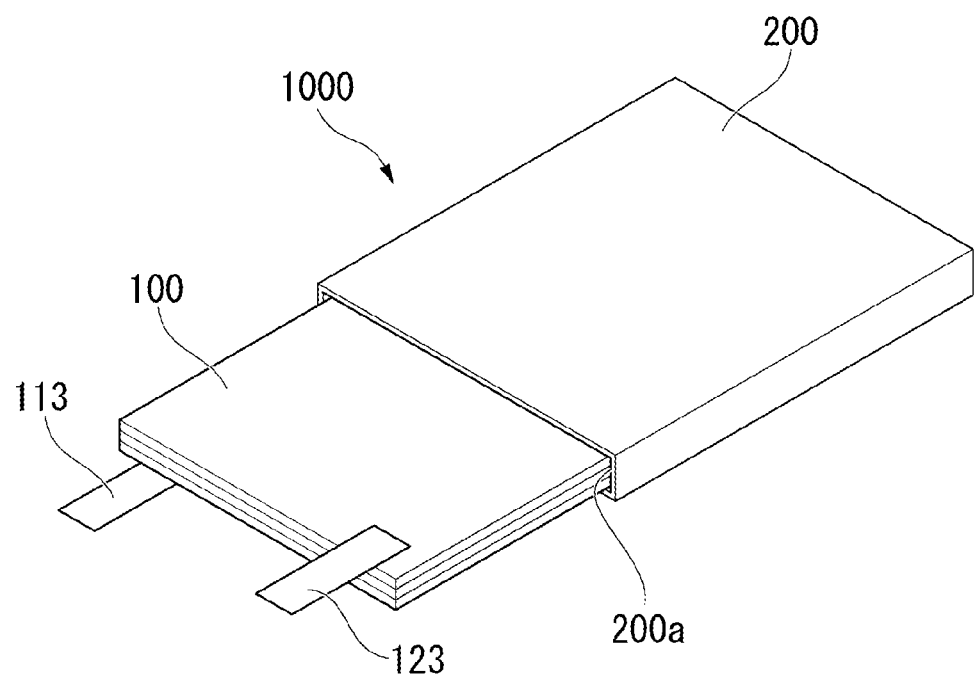
FIG. 2 is a schematic diagram showing an overall configuration of the all-solid-state lithium-ion battery of the embodiment.

FIGS. 1 and 2 are schematic diagrams showing an example of the all-solid-state lithium-ion battery of the present embodiment. FIG. 1 is a schematic diagram showing a laminated body provided with the all-solid-state lithium-ion battery of the present embodiment. FIG. 2 is a schematic diagram showing the overall configuration of the all-solid-state lithium-ion battery of the present embodiment. The all-solid-state lithium-ion battery of the present embodiment is a secondary battery.

An all-solid-state lithium-ion battery 1000 has a laminated body 100 having a positive electrode 110, a negative electrode 120, and a solid electrolyte layer 130, and an exterior body 200 which accommodates the laminated body 100.

A description will be given below of materials forming each member.

The laminated body 100 may have an external terminal 113 connected to a positive electrode current collector 112 and an external terminal 123 connected to a negative electrode current collector 122.

In the laminated body 100, the solid electrolyte layer 130 is interposed between the positive electrode 110 and the negative electrode 120 such that a short-circuit does not occur. In addition, the all-solid-state lithium-ion battery 1000 may have a separator, which is used in a liquid-type lithium-ion secondary battery of the related art, between the positive electrode 110 and the negative electrode 120 to prevent a short circuit between the positive electrode 110 and the negative electrode 120.

The all-solid-state lithium-ion battery 1000 has an insulator (not shown) which insulates the laminated body 100 and the exterior body 200, and a sealing body (not shown) which seals an opening portion 200a of the exterior body 200.

As the exterior body 200, it is possible to use a container formed of a metal material having high corrosion resistance such as aluminum, stainless steel, or nickel-plated steel. In addition, it is also possible to use a container in which a laminated film having at least one surface subjected to corrosion resistance processing is processed into a bag shape.

Examples of the shape of the all-solid-state lithium-ion battery 1000 include a coin shape, a button shape, a paper shape (or sheet shape), a cylindrical shape, a square shape, or the like.

The all-solid-state lithium-ion battery 1000 is illustrated as having one laminated body 100, but is not limited thereto.

The all-solid-state lithium-ion battery 1000 may have a configuration in which the laminated body 100 is a unit cell and a plurality of unit cells (the laminated body 100) are sealed inside the exterior body 200.

A description will be given below of each configuration in order.

(Positive Electrode)

The positive electrode 110 of the present embodiment has a positive electrode active material layer 111 and the positive electrode current collector 112.

The positive electrode active material layer 111 includes the positive electrode active material which is one embodiment of the present invention described above. In addition, the positive electrode active material layer 111 may include a solid electrolyte (second solid electrolyte), a conductive material, and a binder.

The positive electrode active material included in the positive electrode active material layer 111 is in contact with the second solid electrolyte included in the positive electrode active material layer 111. Specifically, the positive electrode active material layer 111 includes a plurality of particles (positive electrode active material) including crystals of a lithium metal composite oxide, and a solid electrolyte in contact with the particles (positive electrode active material) filled between the plurality of particles (positive electrode active material).

(Solid Electrolyte)

As a solid electrolyte which the positive electrode active material layer 111 of the present embodiment may have, it is possible to adopt a solid electrolyte which has lithium ion conductivity and is used for known all-solid-state batteries. Examples of such solid electrolytes include inorganic electrolytes and organic electrolytes. Examples of the inorganic electrolyte include oxide-based solid electrolytes, sulfide-based solid electrolytes, and hydride-based solid electrolytes. Examples of the organic electrolyte include polymer-based solid electrolytes.

In the present embodiment, it is preferable to use an oxide-based solid electrolyte or a sulfide-based solid electrolyte, and more preferable to use an oxide-based solid electrolyte.

(Oxide-Based Solid Electrolyte)

Examples of oxide-based solid electrolytes include perovskite-type oxides, NASICON-type oxides, LISICON-type oxides, garnet-type oxides, and the like.

Examples of perovskite-type oxides include Li—La—Ti-based oxides such as $Li_aLa_{1-a}TiO_3$ (0<a<1), Li—La—Ta-based oxides such as $Li_bLa_{1-b}TaO_3$ (0<b<1), and Li—La—Nb-based oxides such as $Li_cLa_{1-c}NbO_3$ (0<c<1), and the like.

Examples of NASICON-type oxides include $Li_{1+d}Al_dTi_{2-d}(PO_4)_3$ (0≤d≤1), and the like. The NASICON-type oxide is an oxide represented by $Li_mM^1{}_nM^2{}_oP_pO_q$.

In the formula, $M^1$ is one or more types of elements selected from the group consisting of B, Al, Ga, In, C, Si, Ge, Sn, Sb, and Se.

In the formula, $M^2$ is one or more types of elements selected from the group consisting of Ti, Zr, Ge, In, Ga, Sn, and Al.

In the formula, m, n, o, p, and q are arbitrary positive numbers.

LISICON-type oxides include oxides represented by $Li_4M^3O_4$-$Li_3M_4O_4$, and the like.

In the formula, $M^3$ is one or more types of elements selected from the group consisting of Si, Ge, and Ti.

In the formula, $M^4$ is one or more types of elements selected from the group consisting of P, As, and V.

Examples of garnet-type oxides include Li—La—Zr-based oxides such as $Li_7La_3Zr_2O_{12}$ (LLZ), and the like.

The oxide-based solid electrolyte may be a crystalline material or a non-crystalline (amorphous) material. Examples of the non-crystalline (amorphous) solid electrolyte include Li—B—O compounds such as $Li_3BO_3$, $Li_2B_4O_7$, and $LiBO_2$. The oxide-based solid electrolyte preferably includes a non-crystalline material.

(Sulfide-Based Solid Electrolyte)

Examples of the sulfide-based solid electrolyte include $Li_2S$—$P_2S_5$ based compounds, $Li_2S$—$SiS_2$ based compounds, $Li_2S$—$GeS_2$ based compounds, $Li_2S$—$B_2S_3$ based compounds, $Li_2S$—$P_2S_3$ based compounds, $LiI$—$Si_2S$—$P_2S_5$ based compounds, $LiI$—$Li_2S$—$P_2O_5$ based compounds, $LiI$—$Li_3PO_4$—$P_2S_5$ based compounds, $Li_{10}GeP_2S_{12}$, and the like.

In the present specification, the expression "based compound" which refers to a sulfide-based solid electrolyte is used as a general term for solid electrolytes which mainly contain raw materials such as "$Li_2S$" and "$P_2S_5$" described before the "based compound". For example, the $Li_2S$—$P_2S_5$ based compound includes a solid electrolyte including $Li_2S$ and $P_2S_5$ and further including other raw materials. Further, the $Li_2S$—$P_2S_5$ compound also includes a solid electrolyte in which the mixing ratio of $Li_2S$ and $P_2S_5$ is different.

Examples of the $Li_2S$—$P_2S_5$-based compound include $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$ $Li_2S$—$P_2S_5$—$Z_mS_n$ (m and n are positive numbers, Z is Ge, Zn, or Ga), and the like.

Examples of $Li_2S$—$SiS_2$-based compounds include $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$SiS_2$—$Li_3PO_4$, $Li_2S$—$SiS_2$—$Li_2SO_4$, $Li_2S$—$SiS_2$-$Li_xMO_y$ (x and y are positive numbers, M is P, Si, Ge, B, Al, Ga, or In), and the like.

Examples of $Li_2S$—$GeS_2$-based compounds include $Li_2S$—$GeS_2$, $Li_2S$—$GeS_2$—$P_2S_5$, and the like.

The sulfide-based solid electrolyte may be a crystalline material or a non-crystalline (amorphous) material. The sulfide-based solid electrolyte preferably includes a non-crystalline material.

(Hydride-Based Solid Electrolyte)

Examples of the hydride-based solid electrolyte material include $LiBH_4$, $LiBH_4$-3KI, $LiBH_4$—$PI_2$, $LiBH_4$—$P_2S_5$, $LiBH_4$—$LiNH_2$, $3LiBH_4$—$LiI$, $LiNH_2$, $Li_2AlH_6$, $Li(NH_2)_2I$, $Li_2NH$, $LiGd(BH_4)_3C$, $Li_2(BH_4)(NH_2)$, $Li_3(NH_2)I$, $Li_4(BH_4)(NH_2)_3$, and the like.

Examples of the polymer-based solid electrolyte include organic polymer electrolytes such as polyethylene oxide-based polymer compounds, polymer compounds including one or more types selected from the group consisting of polyorganosiloxane chains and polyoxyalkylene chains.

In addition, it is also possible to use a so-called gel type in which a non-aqueous electrolytic solution is held in a polymer compound. The nonaqueous electrolytic solution in the gel-type polymer-based solid electrolyte loses fluidity and exhibits a higher rigidity than the electrolytic solution, unlike the nonaqueous electrolytic solution in liquid-type lithium-ion secondary batteries of the related art. The rigidity of the electrolytic solution used for the liquid-type lithium-ion secondary battery is zero. In this respect, the lithium-ion secondary battery using the gel-type polymer-based solid electrolyte also corresponds to the all-solid-state lithium-ion battery of the present invention, unlike the liquid-type lithium-ion secondary battery of the related art.

In the gel-type polymer-based solid electrolyte, the ratio of the polymer compound included in the solid electrolyte layer is preferably 1% by mass or more and 50% by mass or less.

It is possible to use two or more types of solid electrolytes in combination in a range in which the effects of the invention are not impaired.

The positive electrode active material of the present embodiment has an average crush strength of more than 50 MPa. Among the solid electrolytes described above, even in a case of being combined with an oxide-based solid electrolyte having high hardness, isolated particles are unlikely to be generated when pressure is applied. For this reason, it is possible to suitably use the positive electrode active material of the present embodiment for an all-solid-state lithium secondary battery using an oxide-based solid electrolyte.

(Conductive Material)

As a conductive material which the positive electrode active material layer 111 of the present embodiment may have, it is possible to use a carbon material or a metal compound. Examples of the carbon material include graphite powder, carbon black (for example, acetylene black), fibrous carbon material, and the like. Since carbon black is fine particles with a large surface area, adding an appropriate amount to the positive electrode active material layer 111 increases the conductivity inside the positive electrode 110 and makes it possible to improve the charge or discharge efficiency and output characteristics. On the other hand, if the amount of carbon black added is excessively large, this causes both the binding force between the positive electrode active material layer 111 and the positive electrode current collector 112 and the binding force inside the positive electrode active material layer 111 to decrease while the internal resistance increases. Examples of the metal compound include metals having electrical conductivity, metal alloys, and metal oxides.

The ratio of the conductive material in the positive electrode active material layer 111 is preferably 5 parts by mass or more and 20 parts by mass or less with respect to 100 parts by mass of the positive electrode active material in a case of a carbon material. In a case where a fibrous carbon material such as graphitized carbon fiber or carbon nanotubes is used as the conductive material, it is also possible to reduce this ratio.

(Binder)

In a case where the positive electrode active material layer 111 has a binder, it is possible to use a thermoplastic resin as the binder. Examples of the thermoplastic resin include fluororesins such as polyimide resin, polyvinylidene fluoride (may be referred to below as PVdF), polytetrafluoroethylene (may be referred to below as PTFE), tetrafluoroethylene/hexafluoropropylene/vinylidene fluoride copolymer, propylene hexafluoride/vinylidene fluoride copolymer, and tetrafluoroethylene/perfluorovinyl ether copolymer, polyolefin resins such as polyethylene or polypropylene, and ethyl cellulose.

Polyvinylidene fluoride may be referred to below as PVdF.

These thermoplastic resins may be used as a mixture of two or more types. By using a fluororesin and a polyolefin resin as a binder and setting the ratio of the fluororesin with respect to the whole positive electrode active material layer 111 to 1% by mass or more and 10% by mass or less and the ratio of the polyolefin resin to 0.1% by mass or more and 2% by mass or less, the positive electrode active material layer 111 is obtained in which there is both high adhesion between the positive electrode active material layer 111 and the positive electrode current collector 112 and a high bonding force inside the positive electrode active material layer 111.

The positive electrode active material layer 111 may be processed as a sheet-shaped molded body including a positive electrode active material in advance and used as the "electrode" in the present invention. In addition, in the following description, such a sheet-shaped molded body may be referred to as a "positive electrode active material sheet". A laminated body in which a current collector is laminated on the positive electrode active material sheet may be used as the electrode.

The positive electrode active material sheet may include any one or more selected from the group consisting of the solid electrolyte described above, a conductive material, and a binder.

The positive electrode active material sheet is obtained by, for example, mixing a positive electrode active material, a sintering aid, the conductive material described above, the binder described above, a plasticizer, and a solvent to prepare a slurry, and coating and drying the obtained slurry on a carrier film.

As the sintering aid, for example, it is possible to use $Li_3BO_3$ or $Al_2O_3$.

As the plasticizer, for example, it is possible to use dioctyl phthalate.

As the solvent, for example, it is possible to use acetone, ethanol, and N-methyl-2-pyrrolidone.

When preparing the slurry, it is possible to use a ball mill for mixing. Since the obtained mixture often includes bubbles mixed during the mixing, it is good to carry out degassing by depressurizing. When degassing, a part of the solvent volatilizes and concentrates, such that the viscosity of the slurry becomes high.

It is possible to coat the slurry using a known doctor blade.

It is possible to use a PET film as the carrier film.

The positive electrode active material sheet obtained after drying is peeled from the carrier film, and processed into a necessary shape by an appropriate punch process before use. In addition, the positive electrode active material sheet may be uniaxially pressed in the thickness direction as appropriate.

(Positive Electrode Current Collector)

As the positive electrode current collector 112 in the positive electrode 110 of the present embodiment, it is possible to use a sheet-shaped member of a material formed of a metal material such as Al, Ni, stainless steel, or Au. Above all, in terms of being easy to process and inexpensive, a member in which Al is the forming material and which is processed into a thin film is preferable.

Examples of a method of supporting the positive electrode active material layer 111 on the positive electrode current collector 112 include a method of press-molding the positive electrode active material layer 111 on the positive electrode current collector 112. It is possible to use a cold press or a hot press for the press-molding.

In addition, the positive electrode active material layer 111 may be supported on the positive electrode current collector 112 by making a mixture of a positive electrode active material, a solid electrolyte, a conductive material, and a binder into a paste using an organic solvent to form a positive electrode mixture, coating and drying the obtained positive electrode mixture on at least one surface side of the positive electrode current collector 112, and carrying out pressing and fixing.

In addition, the positive electrode active material layer 111 may be supported on the positive electrode current collector 112 by making a mixture of a positive electrode active material, a solid electrolyte, and a conductive material into a paste using an organic solvent to form a positive electrode mixture, coating and drying the obtained positive electrode mixture on at least one surface side of the positive electrode current collector 112, and carrying out sintering.

Examples of the organic solvent able to be used for the positive electrode mixture include amine solvents such as N,N-dimethylaminopropylamine and diethylenetriamine; ether solvents such as tetrahydrofuran; ketone solvents such as methyl ethyl ketone; ester solvents such as methyl acetate; and amide solvents such as dimethylacetamide or N-methyl-2-pyrrolidone. N-methyl-2-pyrrolidone may be referred to below as NMP.

Examples of the method of coating the positive electrode mixture to the positive electrode current collector 112 include a slit die coating method, a screen coating method, a curtain coating method, a knife coating method, a gravure coating method, and an electrostatic spray method.

It is possible to manufacture the positive electrode 110 by the methods described above.

(Negative Electrode)

The negative electrode 120 has a negative electrode active material layer 121 and the negative electrode current collector 122. The negative electrode active material layer 121 includes a negative electrode active material. In addition, the negative electrode active material layer 121 may include a solid electrolyte and a conductive material. As the solid electrolyte, conductive material, and binder, it is possible to use those described above.

(Negative Electrode Active Material)

Examples of the negative electrode active material of the negative electrode active material layer 121 include a carbon material, a chalcogen compound (oxide, sulfide, and the like), a nitride, a metal or an alloy, and materials able to be doped and de-doped with lithium ions at a lower potential than the positive electrode 110.

Examples of the carbon material able to be used as the negative electrode active material include graphite such as natural graphite and artificial graphite, cokes, carbon black, pyrolytic carbons, carbon fiber, and a calcined body of an organic polymer compound.

Examples of oxides able to be used as the negative electrode active material include oxides of silicon represented by the formula $SiO_x$ (where x is a positive real number) such as $SiO_2$ and SiO; oxides of titanium represented by the formula $TiO_x$ (where x is a positive real number) such as $TiO_2$ and TiO; oxides of vanadium represented by the formula $VO_x$ (where x is a positive real number) such as $V_2O_5$ and $VO_2$; oxides of iron represented by the formula $FeO_x$ (where x is a positive real number) such as $Fe_3O_4$, $Fe_2O_3$, and FeO; oxides of tin represented by the formula $SnO_x$ (where x is a positive real number) such as $SnO_2$ and SnO; oxides of tungsten represented by General Formula $WO_x$ (where x is a positive real number) such as $WO_3$ or $WO_2$; and metal composite oxides containing lithium and titanium or vanadium such as $Li_4Ti_5O_{12}$ and $LiVO_2$.

Examples of sulfides able to be used as the negative electrode active material include titanium sulfides represented by the formula $TiS_x$ (where x is a positive real number) such as $Ti_2S_3$, $TiS_2$, and TiS; vanadium sulfides represented by the formula $VS_x$ (where x is a positive real number) such as $V_3S_4$, $VS_2$, and VS; iron sulfides represented by the formula $FeS_x$ (where x is a positive real number) such as $Fe_3S_4$, $FeS_2$, and FeS; molybdenum sulfides represented by the formula $MoS_x$ (where x is a positive real number) such as $Mo_2S_3$ and $MoS_2$; tin sulfides represented by the formula $SnS_x$ (where x is a positive real number) such as $SnS_2$ and SnS; tungsten sulfides represented by the formula WSx (where x is a positive real number) such as $WS_2$; antimony sulfides represented by the formula $SbS_x$ (where x is a positive real number) such as $Sb_2S_3$; and selenium sulfides represented by the formula $SeS_x$ (where x is a positive real number) such as $Se_5S_3$, $SeS_2$, and SeS.

Examples of nitrides able to be used as the negative electrode active material include lithium-containing nitrides such as $Li_3N$ and $Li_{3-x}A_xN$ (where A is one or both of Ni and Co, and $0<x<3$ is satisfied).

These carbon materials, oxides, sulfides, and nitrides may be used as one type or in a combination of two or more types. In addition, these carbon materials, oxides, sulfides, and nitrides may be either crystalline or amorphous.

In addition, examples of the metal able to be used as the negative electrode active material include lithium metal, silicon metal, tin metal, and the like.

Examples of alloys able to be used as the negative electrode active material include lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$.

These metals and alloys are processed into foil, for example, and mainly used alone as electrodes.

Among the negative electrode active materials described above, carbon material containing graphite such as natural graphite or artificial graphite as a main component is preferably used for the reason that the potential of the negative electrode 120 hardly changes during charging from the uncharged state to the fully charged state (good potential flatness), the average discharge potential is low, and the capacity retention rate at the time of repeated charging and discharging is high (good cycle characteristics). The shape of the carbon material may be, for example, any of a flaky shape such as natural graphite, a spherical shape such as mesocarbon microbeads, a fibrous shape such as graphitized carbon fiber, an aggregate of fine powder, or the like.

In addition, among the negative electrode active materials described above, oxides are preferably used for the reason that the thermal stability thereof is high, that it is difficult to produce dendrites (dendritic crystals) due to Li metal, and the like. As the shape of the oxide, a fibrous shape, an aggregate of fine powder, or the like is preferably used.

(Negative Electrode Current Collector)

Examples of the negative electrode current collector 122 in the negative electrode 120 include a band-shaped member in which a forming material is a metal material such as Cu, Ni, or stainless steel. Among the above, in terms of not easily forming an alloy with lithium and being easy to process, it is preferable to use a current collector in which Cu is a forming material and which is processed into a thin film.

Examples of methods of supporting the negative electrode active material layer 121 on the negative electrode current collector 122 include, in the same manner as the case of the positive electrode 110, a method using press-molding, a method in which a paste-like negative electrode mixture including a negative electrode active material is coated on the negative electrode current collector 122 and pressed and crimped after drying, and a method in which a paste-like negative electrode mixture including a negative electrode active material is coated on the negative electrode current collector 122, dried, and then sintered.

(Solid Electrolyte Layer)

The solid electrolyte layer 130 has the solid electrolyte (first solid electrolyte) described above. In a case where the positive electrode active material layer 111 includes a solid electrolyte, the solid electrolyte (first solid electrolyte) forming the solid electrolyte layer 130 and the solid electrolyte (second solid electrolyte) included in the positive electrode active material layer 111 may be the same material. The solid electrolyte layer 130 functions as a medium which transmits lithium ions, and also functions as a separator which separates the positive electrode 110 and the negative electrode 120 to prevent a short circuit.

It is possible to form the solid electrolyte layer 130 by depositing an inorganic solid electrolyte by a sputtering method on the surface of the positive electrode active material layer 111 in the positive electrode 110 described above.

In addition, it is possible to form the solid electrolyte layer 130 by coating and drying a paste-like mixture including a solid electrolyte on the surface of the positive electrode active material layer 111 of the positive electrode 110 described above. After drying, the solid electrolyte layer 130 may be formed by press-molding and pressing with a cold isostatic pressing method (CIP).

Further, it is possible to form the solid electrolyte layer 130 by forming the solid electrolyte in a pellet shape in advance, stacking the solid electrolyte pellets and the positive electrode active material sheet described above, and uniaxially pressing in the laminating direction. The positive electrode active material sheet becomes the positive electrode active material layer 111.

The positive electrode current collector 112 is further arranged on the positive electrode active material layer 111 with respect to the laminated body of the obtained positive electrode active material layer 111 and the solid electrolyte layer 130. It is possible to form the solid electrolyte layer 130 and the positive electrode 110 by uniaxially pressing in the laminating direction and carrying out further sintering.

The positive electrode 110 is in contact with the solid electrolyte layer 130. The solid electrolyte layer 130 has a first solid electrolyte.

The positive electrode 110 has the positive electrode active material layer 111 in contact with the solid electrolyte layer 130, and the positive electrode current collector 112 in which the positive electrode active material layer 111 is laminated. The positive electrode active material layer 111 includes a plurality of particles containing crystals of a lithium metal composite oxide (that is, a positive electrode active material which is one embodiment of the present invention), and a solid electrolyte filled between the plurality of particles and in contact with the particles (a second solid electrolyte).

The solid electrolyte and particles included in the positive electrode active material layer 111 are each in contact with the solid electrolyte layer 130. That is, the particles included in the positive electrode active material layer 111 are in contact with the solid electrolyte and the solid electrolyte layer 130 included in the positive electrode active material layer 111.

Here, it is not necessary that all of the particles (positive electrode active material) included in the positive electrode active material layer 111 be in contact with the solid electrolyte and the solid electrolyte layer 130 included in the positive electrode active material layer 111.

The positive electrode active material included in the positive electrode active material layer 111 is brought into contact with the solid electrolyte included in the positive electrode active material layer 111 so as to be conductive with the solid electrolyte included in the positive electrode active material layer 111. In addition, the positive electrode active material included in the positive electrode active material layer 111 is brought into contact with the solid electrolyte layer 130, so as to be conductive with the solid electrolyte layer 130. Furthermore, the solid electrolyte included in the positive electrode active material layer 111 is brought into contact with the solid electrolyte layer 130 so as to be conductive with the solid electrolyte layer 130.

Due to this, the positive electrode active material included in the positive electrode active material layer 111 is directly or indirectly conductive with the solid electrolyte layer 130.

It is possible to manufacture the laminated body 100 by laminating the negative electrode 120 in a posture in which a negative electrode electrolyte layer 121 is in contact with the surface of the solid electrolyte layer 130 using a known method with respect to the solid electrolyte layer 130 provided on the positive electrode 110 as described above.

According to the positive electrode active material for an all-solid-state lithium-ion battery having the above configuration, it is possible to smoothly exchange the lithium ions with a solid electrolyte at a positive electrode and improve battery performance. Due to this, the solid electrolyte layer 130 comes into contact with the negative electrode active material layer 121 and becomes conductive.

As described above, the obtained all-solid-state lithium-ion battery 100 is provided with the solid electrolyte layer 130 in contact with the positive electrode 110 and the negative electrode 120 such that the positive electrode 110 and the negative electrode 120 are not short-circuited. The provided all-solid-state lithium-ion battery 100 is charged by being connected to an external power source and through the application of a negative potential to the positive electrode 110 and a positive potential to the negative electrode 120.

Furthermore, the charged all-solid-state lithium-ion battery 100 is discharged by connecting a discharge circuit to the positive electrode 110 and the negative electrode 120 and energizing the discharge circuit.

According to the electrode having the configuration described above, having the positive electrode active material for an all-solid-state lithium-ion battery described above makes it possible to improve the battery performance of the all-solid-state lithium-ion battery such as cycle characteristics.

According to the all-solid-state lithium-ion battery having the configuration described above, the positive electrode active material for an all-solid-state lithium-ion battery described above is provided, thus, excellent cycle characteristics is exhibited.

As one aspect, the present invention also includes the following embodiments. Here, "Particles T" means "particles including crystals of a lithium metal composite oxide, in which the lithium metal composite oxide has a layered structure and contains at least Li and a transition metal, and the particles have an average crush strength of more than 50 MPa and satisfy Expression (1)".

$$1.0 \ \mu m \leq D_{min} \tag{1}$$

(In Expression (1), $D_{min}$ is the minimum particle size (μm) in a cumulative particle size distribution curve obtained by measuring with a laser diffraction type particle size distribution measuring device).

(2-1) A use of Particles T for an all-solid-state lithium-ion battery.

(2-2) A use of Particles T for a positive electrode active material of an all-solid-state lithium-ion battery.

(2-3) A use of Particles T for a positive electrode of an all-solid-state lithium-ion battery.

(2-4) A use of Particles T for manufacturing an all-solid-state lithium-ion battery.

(2-5) A use of Particles T for manufacturing a positive electrode active material of an all-solid-state lithium-ion battery.

(2-6) A use of Particles T for manufacturing a positive electrode of an all-solid-state lithium-ion battery.

(2-A) A use according to any one of (2-1) to (2-6) including an oxide-based solid electrolyte as a solid electrolyte.

(3-1) A positive electrode active material in contact with a solid electrolyte layer, in which the positive electrode active material includes Particles T.

(3-1-1) The positive electrode active material according to (3-1), in which the solid electrolyte layer includes an oxide-based solid electrolyte.

(3-2) A positive electrode in contact with a solid electrolyte layer, in which the positive electrode includes a positive electrode active material layer contacting the solid electrolyte layer, and a current collector on which the positive electrode active material layer is laminated, and the positive electrode active material layer includes Particles T.

(3-3) A positive electrode in contact with a solid electrolyte layer, in which the positive electrode includes a positive electrode active material layer contacting the solid electrolyte layer, and a current collector on which the positive electrode active material layer is laminated, and the positive electrode active material layer includes a plurality of Particles T, and the solid electrolyte filled between the plurality of Particles T and in contact with Particles T.

(3-4) A positive electrode according to (3-3), in which the solid electrolyte and the particles included in the positive electrode active material layer each contact the solid electrolyte layer.

(3-A) The positive electrode according to (3-2), (3-3) or (3-4), in which the solid electrolyte layer includes an oxide-based solid electrolyte.

(3-B) The positive electrode according to (3-2), (3-3), (3-4) or (3-A), in which the solid electrolyte of the positive electrode active material layer is an oxide-based solid electrolyte.

(3-5) An all-solid-state lithium-ion battery including the positive electrode active material according to any one of (3-1) and (3-1-1), or the positive electrode according to any one of (3-2), (3-3), (3-4), (3-A), and (3-B).

(4-1) A method for charging an all-solid-state lithium-ion battery including providing a solid electrolyte layer in contact with a positive electrode and a negative electrode so that the positive electrode and the negative electrode are not short-circuited, and applying a negative potential to the positive electrode and a positive potential to the negative electrode by an external power source, in which the positive electrode includes Particles T.

(4-2) A method for discharging an all-solid-state lithium-ion battery including providing a solid electrolyte layer in contact with a positive electrode and a negative electrode so that the positive electrode and the negative electrode are not short-circuited, applying a negative potential to the positive electrode and a positive potential to the negative electrode by an external power source to charge the all-solid-state lithium-ion battery, and connecting a discharge circuit to the positive electrode and the negative electrode of the charged all-solid-state lithium-ion battery, in which the positive electrode includes Particles T.

(4-A) The method according to (4-1) or the method according to (4-2) in which the solid electrolyte layer includes an oxide-based solid electrolyte.

Preferable embodiments according to the present invention were described above with reference to the accompanying drawings, but the present invention is not limited to these examples. The shapes, combinations, and the like of each of the constituent members shown in the examples described above are merely examples and it is possible to make various modifications based on design requirements and the like without departing from the spirit of the present invention.

EXAMPLES

A description will be given below of the present invention with reference to Examples, but the present invention is not limited to these Examples.

<Composition Analysis of Positive Electrode Active Material>

Composition analysis of the positive electrode active material manufactured by the method described below was performed by the above <Composition Analysis>.

<Measurement of Particle Size Distribution>

The particle size distribution of the positive electrode active material was calculated by the above <Measurement of Particle Size Distribution>.

<Measurement of Average Crush Strength>

The "average crush strength" of the lithium metal composite oxide particles included in the positive electrode active material was measured by the above <Measurement of Average crush strength>.

[Particle Selection Criteria]

Lithium metal composite oxide particles were selected by the above [Particle Selection Criteria].

<Method for Confirming Layered Structure>

Whether or not the lithium metal composite oxide included in the positive electrode active material has a layered structure was confirmed by the above <Method for Confirming Layered Structure>. The lithium metal composite oxide included in the positive electrode active material described later has a layered structure.

<Method for Confirming Particle Shape>

The shape of the particles included in the positive electrode active material was confirmed by the method described above <Method for Confirming Particle Shape>. When the positive electrode active material contains single particles, the content thereof was confirmed by the above <Method for Measuring Content of Single Particle>.

Example 1

(Manufacturing of Positive Electrode Active Material 1)

After putting water in a reaction tank provided with a stirrer and an overflow pipe, an aqueous sodium hydroxide solution was added thereto and the liquid temperature was held at 50° C.

A mixed raw material liquid was prepared by mixing an aqueous solution of nickel sulfate, an aqueous solution of cobalt sulfate, and an aqueous solution of manganese sulfate such that the atomic ratio of Ni, Co, and Mn was 0.88:0.08:0.04.

Next, the mixed raw material solution and an ammonium sulfate aqueous solution as a complexing agent were continuously added to the reaction tank under stirring, and nitrogen gas was made to continuously bubble through the reaction tank. An aqueous sodium hydroxide solution was added dropwise at appropriate times such that the pH of the solution in the reaction tank was 12.4 (pH when the liquid temperature of the aqueous solution was 40° C.) to obtain nickel-cobalt-manganese composite hydroxide particles and nickel-cobalt-manganese composite hydroxide 1 was obtained by carrying out washing, then dehydration with a centrifuge, isolation, and drying at 120° C.

Nickel-cobalt-manganese composite hydroxide 1, lithium hydroxide powder, and potassium sulfate powder were weighed and mixed at a molar ratio of Li/(Ni+Co+Mn)=1.05 and $K_2SO_4/(LiOH+K_2SO_4)$=0.1 to obtain a mixed powder 1.

After that, the obtained mixed powder 1 was filled in a sheath made of alumina, and a tapping operation was performed.

Specifically, first, a 30 cm×30 cm×10 cm sheath made of alumina was filled with 4500 g of mixed powder 1.

Next, the sheath made of alumina filled with the mixed powder was placed on a workbench, and a tapping operation of lifting and dropping approximately 1 cm was carried out 5 times to increase the density of the mixed powder 1 in the sheath.

After the tapping operation, calcining was carried out at 800° C. for 10 hours in an oxygen atmosphere to obtain a mixture 1 including a lithium metal composite oxide.

The mixture 1 was mixed with pure water (water temperature 5° C.) such that the ratio of the mixture 1 was 30% by mass with respect to the total amount of mixture 1 and pure water, and the obtained slurry was stirred for 10 minutes.

The slurry was dehydrated, and the obtained solid material was rinsed with pure water (liquid temperature 5° C.) with twice the mass of the mixture 1 used for preparing the above slurry (rinse step). The solid material was dehydrated again, vacuum dried at 80° C. for 15 hours, and then vacuum dried at 150° C. for 8 hours to obtain the positive electrode active material 1.

(Evaluation of Positive Electrode Active Material 1)

When the composition of the positive electrode active material 1 was analyzed and made to correspond to the composition formula (A), x=0.05, y=0.08, z=0.04, w=0.

As a result of SEM observation of the positive electrode active material 1, single particles were included. The content proportion of single particle was more than 90%.

When the particle size distribution of the positive electrode active material 1 was measured, $D_{min}$ was 1.06 μm. The average crush strength of the positive electrode active material 1 was 68.37 MPa.

Reference Example (Manufacturing of Positive Electrode Active Material 2)

After putting water in a reaction tank provided with a stirrer and an overflow pipe, an aqueous sodium hydroxide solution was added thereto and the liquid temperature was held at 50° C.

A mixed raw material liquid was prepared by mixing an aqueous solution of nickel sulfate, an aqueous solution of cobalt sulfate, and an aqueous solution of manganese sulfate at a ratio such that the atomic ratio of Ni, Co, and Mn was 0.50:0.20:0.30.

Next, the mixed raw material solution and an ammonium sulfate aqueous solution as a complexing agent were continuously added to the reaction tank under stirring, and nitrogen gas was made to continuously bubble through the reaction tank. An aqueous sodium hydroxide solution was added dropwise at appropriate times such that the pH of the solution in the reaction tank was 11.1 (pH when the liquid temperature of the aqueous solution was 40° C.) to obtain nickel-cobalt-manganese composite hydroxide particles and nickel-cobalt-manganese composite hydroxide 2 was obtained by carrying out washing, then dehydration with a centrifuge, isolation, and drying at 120° C.

Nickel-cobalt-manganese composite hydroxide particles 2 and lithium hydroxide powder were weighed and mixed at a molar ratio of Li/(Ni+Co+Mn)=1.05 to obtain mixed powder 2.

After that, the obtained mixed powder 2 was filled in a sheath made of alumina, and a tapping operation was performed.

Specifically, first, a 30 cm×30 cm×10 cm sheath made of alumina was filled with 4500 g of mixed powder 2.

Next, the sheath made of alumina filled with the mixed powder was placed on a workbench, and a tapping operation of lifting and dropping approximately 1 cm was carried out 5 times to increase the density of the mixed powder 2 in the sheath.

After the tapping operation, the positive electrode active material 2 was obtained by calcining at 970° C. for 4 hours in an air atmosphere.

(Evaluation of Positive Electrode Active Material 2)

When the composition analysis of the positive electrode active material 2 was performed and made to correspond to the composition formula (A), x=0.05, y=0.20, z=0.30, and w=0.

As a result of SEM observation of the positive electrode active material 2, primary particles and secondary particles were included and single particles were not included.

When the particle size distribution of the positive electrode active material 2 was measured, $D_{min}$ was 3.00 μm. The average crush strength of the positive electrode active material 2 was 94.68 MPa.

Example 3

(Manufacturing of Positive Electrode Active Material 3)

After putting water in a reaction tank provided with a stirrer and an overflow pipe, an aqueous sodium hydroxide solution was added thereto and the liquid temperature was held at 50° C.

A mixed raw material liquid 3 was prepared by mixing an aqueous solution of nickel sulfate, an aqueous solution of cobalt sulfate, and an aqueous solution of manganese sulfate at a ratio such that the atomic ratio of Ni, Co, and Mn was 0.55:0.20:0.25.

Next, the mixed raw material liquid 3 and the ammonium sulfate aqueous solution as a complexing agent were continuously added to the reaction tank under stirring. An aqueous sodium hydroxide solution was added dropwise at appropriate times such that the pH of the solution in the reaction tank was 12.0 (the pH when the liquid temperature of the aqueous solution was 40° C.) to obtain nickel-cobalt-manganese composite hydroxide particles.

The obtained nickel-cobalt-manganese composite hydroxide particles were washed, then dehydrated with a centrifuge, isolated, and dried at 120° C. to obtain nickel-cobalt-manganese composite hydroxide 3.

Nickel-cobalt-manganese composite hydroxide particles 3 and lithium hydroxide monohydrate powder were weighed and mixed at a molar ratio of Li/(Ni+Co+Mn)=1.03 to obtain mixed powder 3.

After that, the obtained mixed powder 3 was filled in a sheath made of alumina, and a tapping operation was performed.

Specifically, first, a 30 cm×30 cm×10 cm sheath made of alumina was filled with 4500 g of mixed powder 2.

Next, the sheath made of alumina filled with the mixed powder was placed on a workbench, and a tapping operation of lifting and dropping approximately 1 cm was carried out 5 times to increase the density of the mixed powder 3 in the sheath.

The obtained mixed powder 3 was calcined at 650° C. for 5 hours in an oxygen atmosphere.

Next, the product was further calcined at 960° C. for 5 hours in an oxygen atmosphere to obtain a calcined product 1.

After the calcining in an oxygen atmosphere described above, calcining was performed at 400° C. for 5 hours in an air atmosphere to obtain a lithium metal composite oxide.

The obtained lithium metal composite oxide was used as the positive electrode active material 3.

(Evaluation of Positive Electrode Active Material 3)

When the composition of the positive electrode active material 3 was analyzed and made to correspond to the composition formula (A), x=0.03, y=0.20, z=0.25, and w=0.

As a result of SEM observation of the positive electrode active material 3, single particles were included. The content proportion of single particle was more than 90%.

When the particle size distribution of the positive electrode active material 3 was measured, $D_{min}$ was 1.19 µm. The average crush strength of the positive electrode active material 3 was 83.54 MPa.

Comparative Example 1

(Manufacturing of Positive Electrode Active Material 4)
A precipitate containing a nickel-cobalt-manganese composite hydroxide was obtained in the same manner as in Example 1 except for the fact that the aqueous sodium hydroxide solution was added dropwise at appropriate times such that the pH of the solution in the reaction tank was 11.2 (the pH when the liquid temperature of the aqueous solution was 40° C.) and the liquid temperature was maintained at 70° C.

The obtained precipitate was pulverized with a counter jet mill (100AFG type, manufactured by Hosokawa Micron Corp.) to obtain nickel-cobalt-manganese composite hydroxide 4. The operating conditions of the counter jet mill were as follows.

(Counter Jet Mill Operating Conditions)
Pulverizing pressure: 0.59 MPa, classification rotation speed: 17000 rpm, supply speed: 2 kg/hour A positive electrode active material 4 was obtained in the same manner as in Example 1 except that the nickel-cobalt-manganese composite hydroxide 4, lithium hydroxide powder, and potassium sulfate powder were weighed and mixed at a molar ratio of Li/(Ni+Co+Mn)=1.20 and $K_2SO_4$/(LiOH+$K_2SO_4$)=0.1 (mol/mol).

(Evaluation of Positive Electrode Active Material 4)

When the composition of the positive electrode active material 4 was analyzed and made to correspond to the composition formula (A), x=0.20, y=0.08, z=0.04, and w=0.

As a result of SEM observation of the positive electrode active material 4, single particles were included. The content proportion of single particle was more than 90%.

When the particle size distribution of the positive electrode active material 4 was measured, $D_{min}$ was 0.85 µm. The average crush strength of the positive electrode active material 3 was 44.63 MPa.

Using the positive electrode active material obtained by the above manufacturing method, the all-solid lithium ion battery was manufactured by the method described in the above <Manufacturing of All-Solid-State Lithium-Ion Secondary Battery>.

<Cycle Test of all-Solid State Battery>

Using the manufactured all-solid lithium ion battery, the cycle maintenance rate is calculated by the method described in the above <Cycle test>.

<Manufacturing of Liquid-type Lithium Secondary Battery>

(Production of Positive Electrode for Lithium Secondary Battery)

A positive electrode active material obtained by the production method described below, a conductive material (acetylene black), and a binder (PVdF) were added so as to have a composition of positive electrode active material:conductive material:binder=92:5:3 (mass ratio) and kneaded to prepare a paste-like positive electrode mixture. When preparing the positive electrode mixture, NMP was used as an organic solvent.

The obtained positive electrode mixture was coated on an Al foil having a thickness of 40 µm as a current collector and vacuum dried at 150° C. for 8 hours to obtain a positive electrode for a lithium secondary battery. The electrode area of this positive electrode for a lithium secondary battery was 1.65 cm².

(Production of Lithium Secondary Battery (Coin-Type Half-Cell))

The following operations were performed in a glove box in an argon atmosphere.

The positive electrode for a lithium secondary battery produced in (Production of Positive Electrode for Lithium Secondary Battery) was placed on the lower lid of a coin-type battery R2032 part (manufactured by Hohsen Corp.) with the aluminum foil surface facing downward, and a separator (porous film formed of polyethylene) was placed thereon.

Here, 300 µl of an electrolytic solution was injected therein. The electrolytic solution used was a mixed solution in which $LiPF_6$ was dissolved to a concentration of 1.0 mol/l in a mixture of ethylene carbonate, dimethyl carbonate, and ethyl methyl carbonate at 30:35:35 (volume ratio).

Next, using metallic lithium as the negative electrode, the negative electrode was placed on the upper side of the laminated film separator, covered with an upper lid via a gasket, and then crimped with a caulking machine to produce a lithium secondary battery (coin-type half-cell R2032, may be referred to below as a "half-cell").

<Cycle Test>

Using the produced half-cell, a charge and discharge cycle test was carried out under the conditions shown below Cycle test conditions:
Temperature: 25° C.
Maximum charging voltage: 4.3V, constant current/constant voltage charging
First cycle charging and discharging current: 0.2CA
Cutoff current of charging: 0.05CA
Minimum discharging voltage: 2.5V, constant current discharge
Charging and discharging current from second to fiftieth cycle: 1.0CA)
Fiftieth cycle charging and discharge current: 0.2CA For the discharge capacity retention rate, the value calculated by the following formula was used.

Discharge capacity retention rate (%)=(Discharge capacity in the fiftieth cycle)/(Discharge capacity in the first cycle)×100

<Evaluation Results>
The evaluation results are shown in Table 1.

TABLE 1

|  | Average crush strength | $D_{min}$ (μm) | Cycle Characteristics | |
| --- | --- | --- | --- | --- |
|  |  |  | Total solid | Liquid LIB |
| Example 1 | 68.38 | 1.06 | 92.70% | 86.63% |
| Reference Example | 94.68 | 3.00 | 82.76% | 91.14% |
| Example 3 | 83.54 | 1.19 | 93.42% | 90.84% |
| Comparative Example 1 | 44.63 | 0.85 | 74.00% | 86.33% |

As a result of the evaluation, the all-solid-state lithium-ion batteries using the positive electrode active materials of Examples 1 to 3 all exhibited high cycle characteristics.

For the positive electrode active materials of Examples and Comparative Examples, liquid-type lithium-ion secondary batteries were prepared and evaluated and, as shown in Table 1, the positive electrode active materials of Examples 1 to 3 were all evaluated as favorably usable. On the other hand, when the positive electrode active material of Comparative Example 1 was set as an all-solid-state lithium-ion secondary battery, the cycle characteristics were deteriorated.

As described above, even with a positive electrode active material which operates favorably in a liquid-type lithium-ion secondary battery, it was found that, with an all-solid-state lithium-ion secondary battery, there is a large difference in the battery performance and the positive electrode active material for the all-solid-state lithium-ion secondary battery according to the present invention exhibits a good battery performance.

From the above, it was found that the present invention is useful.

While preferred embodiments of the invention have been described and illustrated above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

100 . . . Laminated body,
110 . . . Positive electrode,
111 . . . Positive electrode active material layer,
112 . . . Positive electrode current collector,
113 . . . External terminal,
120 . . . Negative electrode,
121 . . . Negative electrode electrolyte layer,
122 . . . Negative electrode current collector,
123 . . . External terminal,
130 . . . Solid electrolyte layer,
200 . . . Exterior body,
200a . . . Opening portion,
1000 . . . All-solid-state lithium-ion battery

What is claimed is:

1. A positive electrode active material in contact with a solid electrolyte layer, comprising:
   particles including crystals of a lithium metal composite oxide,
   wherein the lithium metal composite oxide has a layered structure and contains at least Li and a transition metal, and
   the particles have an average crush strength of more than 50 MPa and less than 100 MPa and satisfy Expression (1)

$$1.0 \text{ μm} \leq D_{min} \quad (1)$$

wherein, in Expression (1), $D_{min}$ is a minimum particle size (μm) in a cumulative particle size distribution curve obtained by measuring with a laser diffraction type particle size distribution measuring device,
   wherein the particles are formed of a secondary particle which is an aggregate of a primary particle, and a single particle which exists independently of the primary particle and the secondary particle, and
   wherein a content of the single particle in the particles is 20% or more.

2. The positive electrode active material according to claim 1, wherein the solid electrolyte layer includes an oxide-based solid electrolyte.

3. The positive electrode active material according to claim 1,
   wherein the transition metal is at least one type selected from the group consisting of Ni, Co, Mn, Ti, Fe, V, and W.

4. The positive electrode active material according to claim 3,
   wherein the lithium metal composite oxide is represented by Formula (A)

$$\text{Li}[\text{Li}_x(\text{Ni}_{(1-y-z-w)}\text{Co}_y\text{Mn}_z\text{M}_w)_{1-x}]\text{O}_2 \quad (A)$$

wherein M is one or more types of elements selected from the group consisting of Fe, Cu, Ti, Mg, Al, W, B, Mo, Nb, Zn, Sn, Zr, Ga, and V, and $-0.10 \leq x \leq 0.30$, $0 \leq y \leq 0.40$, $0 \leq z \leq 0.40$, and $0 \leq w \leq 0.10$ are satisfied.

5. The positive electrode active material according to claim 4,
   wherein, in Formula (A), $1-y-z-w \geq 0.50$ and $y \leq 0.30$ are satisfied.

6. An electrode comprising:
   the positive electrode active material according to claim 1.

7. An all-solid-state lithium-ion battery comprising:
   a positive electrode;
   a negative electrode; and
   a solid electrolyte layer interposed between the positive electrode and the negative electrode,
   wherein the solid electrolyte layer includes a first solid electrolyte,
   the positive electrode has a positive electrode active material layer contacting the solid electrolyte layer and a current collector in which the positive electrode active material layer is laminated, and
   the positive electrode active material layer includes the positive electrode active material according to claim 1.

8. The all-solid-state lithium-ion battery according to claim 7,
   wherein the positive electrode active material layer includes the positive electrode active material and a second solid electrolyte.

9. The all-solid-state lithium-ion battery according to claim 8,
   wherein the first solid electrolyte and the second solid electrolyte are the same material.

10. The all-solid-state lithium-ion battery according to claim 7, wherein the first solid electrolyte has a non-crystalline structure.

11. The all-solid-state lithium-ion battery according to claim 7,
wherein the first solid electrolyte is an oxide-based solid electrolyte.

12. A positive electrode in contact with a solid electrolyte layer,
wherein the positive electrode includes a positive electrode active material layer contacting the solid electrolyte layer, and a current collector on which the positive electrode active material layer is laminated,
the positive electrode active material layer includes particles including crystals of a lithium metal composite oxide,
the lithium metal composite oxide has a layered structure and contains at least Li and a transition metal,
the particles have an average crush strength of more than 50 MPa and less than 100 MPa and satisfy Expression (1)

$$1.0\ \mu m \leq D_{min} \quad (1)$$

wherein, in Expression (1), $D_{min}$ is a minimum particle size (m) in a cumulative particle size distribution curve obtained by measuring with a laser diffraction type particle size distribution measuring device,
wherein the particles are formed of a secondary particle which is an aggregate of a primary particle, and a single particle which exists independently of the primary particle and the secondary particle, and
wherein a content of the single particle in the particles is 20% or more.

13. The positive electrode according to claim 12,
wherein the solid electrolyte layer includes an oxide-based solid electrolyte.

14. A method for charging an all-solid-state lithium-ion battery including providing a solid electrolyte layer in contact with a positive electrode and a negative electrode so that the positive electrode and the negative electrode are not short-circuited, and applying a negative potential to the positive electrode and a positive potential to the negative electrode by an external power source,
wherein the positive electrode includes particles including crystals of a lithium metal composite oxide,
the lithium metal composite oxide has a layered structure and contains at least Li and a transition metal,
the particles have an average crush strength of more than 50 MPa and less than 100 MPa and satisfy Expression (1)

$$1.0\ \mu m \leq D_{min} \quad (1)$$

wherein, in Expression (1), $D_{min}$ is a minimum particle size ($\mu$m) in a cumulative particle size distribution curve obtained by measuring with a laser diffraction type particle size distribution measuring device,
wherein the particles are formed of a secondary particle which is an aggregate of a primary particle, and a single particle which exists independently of the primary particle and the secondary particle, and
wherein a content of the single particle in the particles is 20% or more.

15. The method for charging an all-solid-state lithium-ion battery according to claim 14, wherein the solid electrolyte layer includes an oxide-based solid electrolyte.

16. A method for discharging an all-solid-state lithium-ion battery including providing a solid electrolyte layer in contact with a positive electrode and a negative electrode so that the positive electrode and the negative electrode are not short-circuited, applying a negative potential to the positive electrode and a positive potential to the negative electrode by an external power source to charge the all-solid-state lithium-ion battery, and connecting a discharge circuit to the positive electrode and the negative electrode of the charged all-solid-state lithium-ion battery,
wherein the positive electrode includes particles including crystals of a lithium metal composite oxide,
the lithium metal composite oxide has a layered structure and contains at least Li and a transition metal, and
the particles have an average crush strength of more than 50 MPa and less than 100 MPa and satisfy Expression (1)

$$1.0\ \mu m \leq D_{min} \quad (1)$$

wherein, in Expression (1), $D_{min}$ is a minimum particle size ($\mu$m) in a cumulative particle size distribution curve obtained by measuring with a laser diffraction type particle size distribution measuring device,
wherein the particles are formed of a secondary particle which is an aggregate of a primary particle, and a single particle which exists independently of the primary particle and the secondary particle, and
wherein a content of the single particle in the particles is 20% or more.

17. The method for discharging an all-solid-state lithium-ion battery according to claim 16, wherein the solid electrolyte layer includes an oxide-based solid electrolyte.

* * * * *